(12) United States Patent
Shiotsu et al.

(10) Patent No.: US 8,791,796 B2
(45) Date of Patent: Jul. 29, 2014

(54) WIRELESS TAG DEVICE, STORAGE MEDIUM STORING CONTROL PROGRAM FOR WIRELESS TAG DEVICE, AND CONTROL METHOD FOR WIRELESS TAG DEVICE

(75) Inventors: Shinichi Shiotsu, Kawasaki (JP); Satoshi Inano, Kawasaki (JP); Hideki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 13/434,202

(22) Filed: Mar. 29, 2012

(65) Prior Publication Data
US 2012/0182131 A1 Jul. 19, 2012

Related U.S. Application Data

(63) Continuation of application No. PCT/JP2009/005233, filed on Oct. 8, 2009.

(51) Int. Cl.
*H04Q 5/22* (2006.01)

(52) U.S. Cl.
USPC ....... 340/10.4; 340/10.1; 340/10.2; 340/10.3; 340/10.5; 340/10.6; 340/572.1; 340/572.2; 340/572.3; 340/572.4; 340/572.5; 340/572.6; 340/572.7; 340/572.8; 340/572.9

(58) Field of Classification Search
CPC ............. G06K 7/0008; G06K 19/0723; G08B 13/2474
USPC .......................... 340/10.1–10.6, 572.1–572.9
See application file for complete search history.

(56) References Cited

U.S. PATENT DOCUMENTS

| 5,051,741 | A | 9/1991 | Wesby | |
|---|---|---|---|---|
| 7,741,956 | B1* | 6/2010 | Nysen | 340/10.41 |
| 2005/0248454 | A1 | 11/2005 | Hanson et al. | |
| 2006/0022800 | A1* | 2/2006 | Krishna et al. | 340/572.1 |
| 2006/0276206 | A1 | 12/2006 | Shiotsu et al. | |
| 2007/0167139 | A1 | 7/2007 | Inano et al. | |
| 2010/0245052 | A1 | 9/2010 | Kitayoshi | |
| 2013/0063250 | A1* | 3/2013 | Raphaeli et al. | 340/10.1 |

FOREIGN PATENT DOCUMENTS

| JP | 5-507820 | 11/1993 |
|---|---|---|
| JP | 6-260963 | 9/1994 |
| JP | 2006-309592 | 11/2006 |
| JP | 2006-338489 | 12/2006 |
| JP | 2007-60435 | 3/2007 |
| JP | 2007-72746 | 3/2007 |

(Continued)

*Primary Examiner* — George Bugg
*Assistant Examiner* — Anthony D Afrifa-Kyei
(74) *Attorney, Agent, or Firm* — Staas & Halsey LLP

(57) ABSTRACT

A wireless tag device can communicate with an inquiry device includes: a local terminal storage unit storing local terminal identification information which can be discriminated from another wireless tag device; a reception detection unit detecting a signal transmitted from the inquiry device or another wireless tag device; an inquiry signal receiving unit receiving the detected inquiry signal if the inquiry signal is transmitted using a first frequency from the inquiry device; a reply signal transmitting unit transmitting a reply signal in response to the inquiry signal using a second frequency different from the first frequency; and a report signal transmitting unit transmitting a report signal including the local terminal identification information stored in the local terminal storage unit using a third frequency different from the second frequency if the inquiry signal transmitted from the inquiry device cannot be detected continuously in a specified time period in the reception detection unit.

6 Claims, 31 Drawing Sheets

(56) References Cited

FOREIGN PATENT DOCUMENTS

| | | |
|---|---|---|
| JP | 2008-504185 | 2/2008 |
| JP | 2008-200383 | 9/2008 |
| JP | 2008-219624 | 9/2008 |
| WO | WO 91/14952 | 10/1991 |
| WO | WO 2006/083265 | 8/2006 |

* cited by examiner

| 4101 |
|---|
| NUMBER OF UNDETECTED TIMES |
| 2 |

FIG. 2

| 4201 |
|---|
| LOCAL TERMINAL IDENTIFICATION INFORMATION |
| Tag001 |

FIG. 3

| 4301 |
|---|
| OTHER TERMINAL IDENTIFICATION INFORMATION |
| Tag002 |
| ・・・ |

F I G. 4

| START CODE | SIGNAL TYPE CODE | ERROR CORRECTION CODE | END CODE |

| START CODE | SIGNAL TYPE CODE | NUMBER OF PIECES OF DATA | TERMINAL IDENTIFICATION INFORMATION (FOR THE NUMBER OF PIECES OF DATA) ... | ERROR CORRECTION CODE | END CODE |

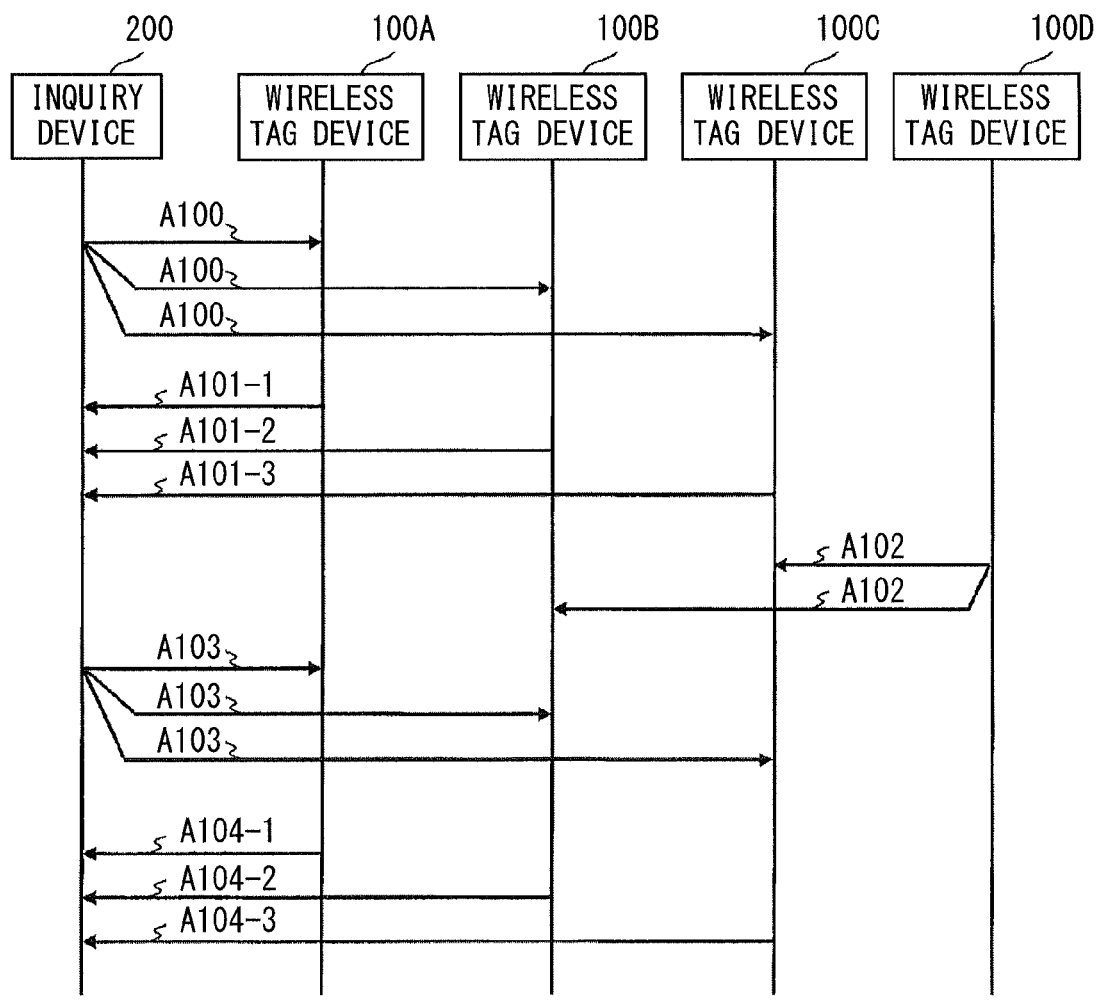
F I G. 8

FIG. 11

| START CODE | SIGNAL TYPE CODE | TERMINAL IDENTIFICATION INFORMATION | ERROR CORRECTION CODE | END CODE |

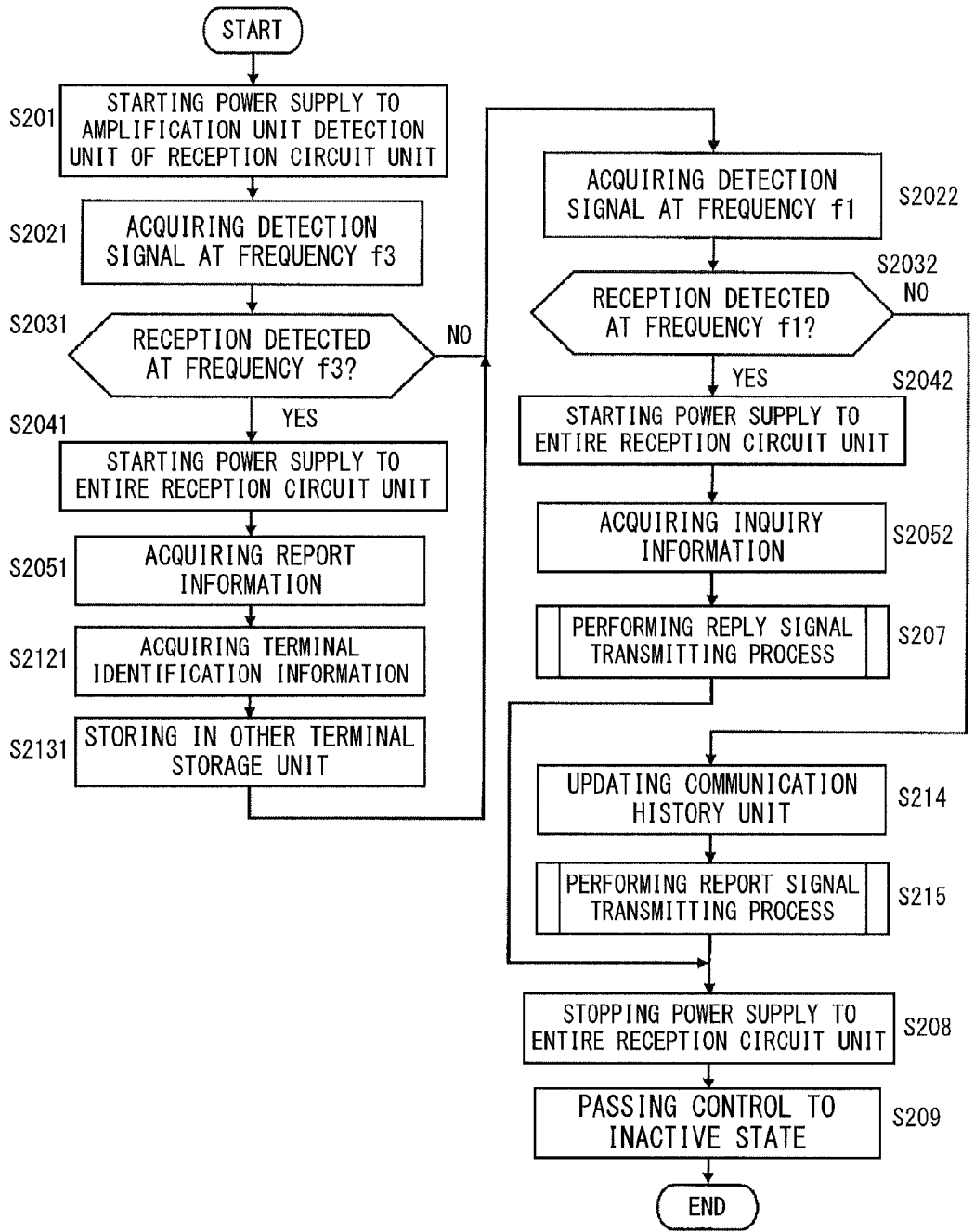
F I G. 1 9

| TERMINAL IDENTIFICATION INFORMATION | DETECTION VALUE |
|---|---|
| Tag001 | 10°C |
| Tag002 | 12°C |

| START CODE | SIGNAL TYPE CODE | TERMINAL IDENTIFICATION INFORMATION | DATA LENGTH | SENSING INFORMATION | ERROR CORRECTION CODE | END CODE |
|---|---|---|---|---|---|---|

| START CODE | SIGNAL TYPE CODE | FIRST SPECIFICATION ID | SECOND SPECIFICATION ID | ERROR CORRECTION CODE | END CODE |
|---|---|---|---|---|---|

| START CODE | SIGNAL TYPE CODE | DATA LENGTH | SENSING INFORMATION | ERROR CORRECTION CODE | END CODE |

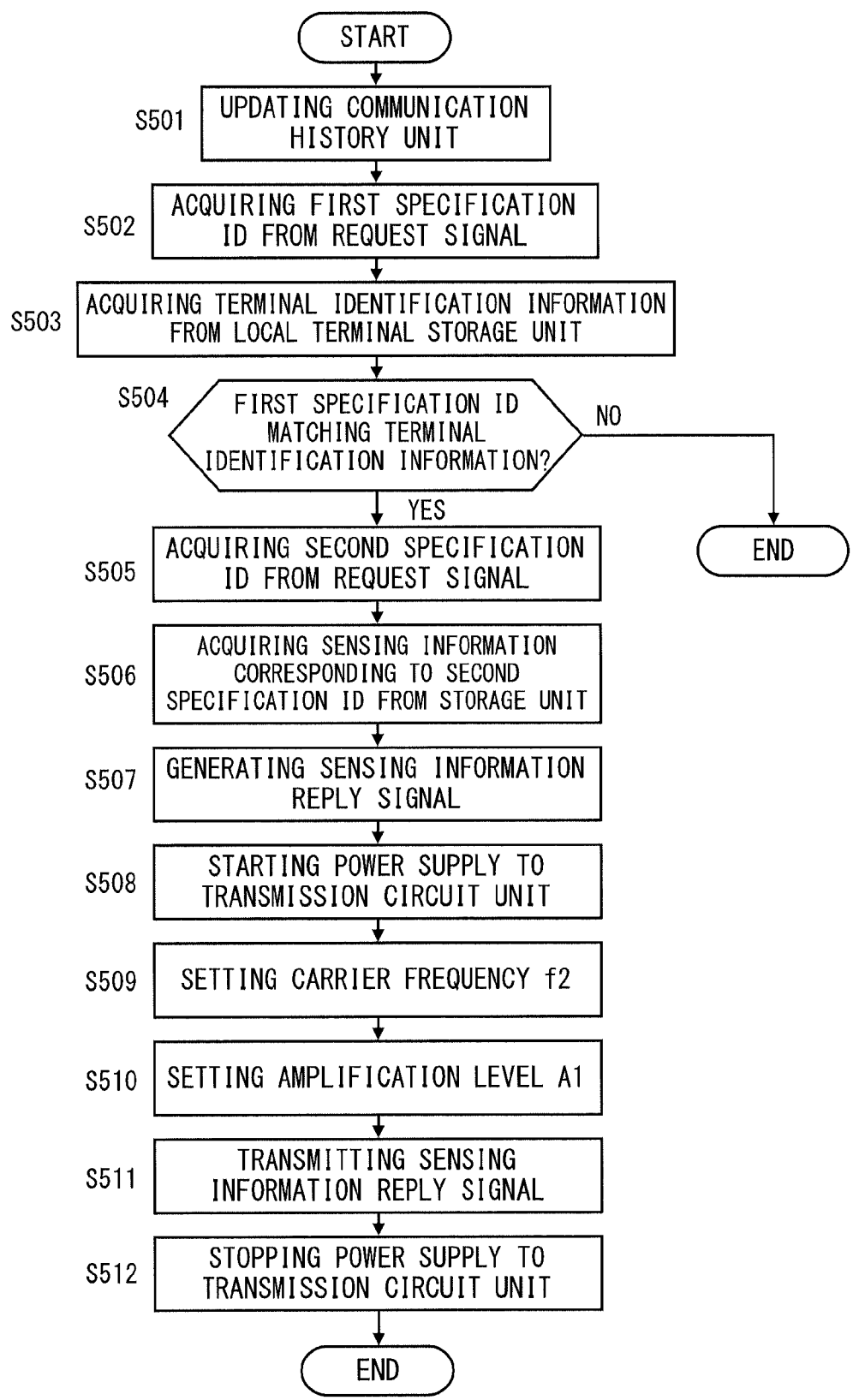
F I G. 29

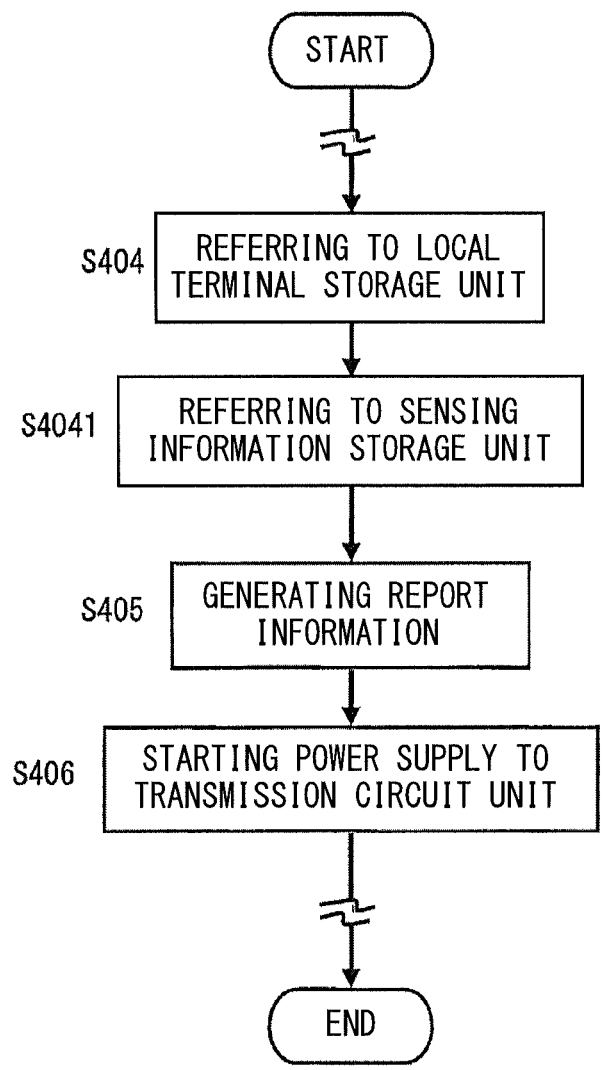
F I G. 30

WIRELESS TAG DEVICE, STORAGE MEDIUM STORING CONTROL PROGRAM FOR WIRELESS TAG DEVICE, AND CONTROL METHOD FOR WIRELESS TAG DEVICE

CROSS-REFERENCE TO RELATED APPLICATIONS

This application is a continuation of PCT application PCT/JP2009/005233, which was filed on Oct. 8, 2009.

FIELD

Some embodiments of the present invention relate to a wireless tag device which communicates information with a specified information reading device (hereafter referred to as an inquiry device) using a radio signal, a control program for the wireless tag device, and a control method for the wireless tag device.

BACKGROUND

There is a wireless tag device which is provided with an information storage device for storing various types of information, and communicates a radio signal with an inquiry device installed in a specified place, thereby transmitting the stored information to the inquiry.

The wireless tag device has a configuration for receiving an inquiry signal transmitted from the inquiry device, and transmitting a reply signal corresponding to the inquiry signal.

For example, when the identification information for unique identification of a wireless tag device is transmitted as a reply signal in response to the inquiry signal from the inquiry device, the inquiry device which has received the reply signal can determine from which wireless tag device the reply signal has been transmitted.

If the wireless tag device is attached to a target object or person to be managed, and the correspondence between the target to be managed and the identification information set in the wireless tag device is stored in the inquiry device or the host device for controlling the inquiry device, then the inquiry device can manage the existence of the target to be managed according to the reply signal received from the wireless tag device.

The wireless tag device can be a passive system for obtaining driving power from a wireless wave transmitted from the inquiry device or an active system for obtaining driving power from a power source such as a battery etc.

As an example of using the wireless tag device, a device configured to be attached to clothing to collect the information about the clothing stored in a clothing warehouse is disclosed in Japanese Laid-open Patent Publication No. 2008-200383 (hereafter referred to as the patent document 1).

The device described in the patent document 1 is provided with a reading device for reading the information transmitted from the wireless tag device attached to the clothing, and is a clothing warehouse for transmitting the information about wearing history when the information about the wireless tag device can be continuously read in a period of a specified wearing season.

In the device described in the patent document 1, the information from the wireless tag device attached to the clothing taken from a warehouse cannot be read. Therefore, the wireless tag device having the period in which the information cannot be continuously read can be determined as having the possibility that the corresponding clothing has been taken out of the warehouse. The clothing from which the information about the wireless tag device has been continuously read can be considered as the clothing which has not been taken out or worn.

SUMMARY

According to an aspect of the invention, a wireless tag device capable of communicating with an inquiry device includes: a local terminal storage unit storing local terminal identification information which can be discriminated from another wireless tag device; a reception detection unit detecting a signal transmitted from the inquiry device or another wireless tag device; an inquiry signal receiving unit receiving the inquiry signal detected by the reception detection unit if the inquiry signal is transmitted using a first frequency from the inquiry device; a reply signal transmitting unit transmitting a reply signal in response to the inquiry signal using a second frequency different from the first frequency; and a report signal transmitting unit transmitting a report signal including the local terminal identification information stored in the local terminal storage unit using a third frequency different from the second frequency if the inquiry signal transmitted from the inquiry device cannot be detected continuously in a specified time period in the reception detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory view of an example of the history information stored in the communication history unit;

FIG. 3 is an explanatory view of an example of the local terminal identification information stored in the local terminal storage unit;

FIG. 4 is an explanatory view of an example of the other terminal information stored in the other terminal storage unit;

FIG. 6 is an explanatory view of an example of a frame format of an inquiry signal;

FIG. 7 is an explanatory view of an example of a frame format of a reply signal;

FIG. 8 is an explanatory view of the outline of the process in the wireless tag system;

FIG. 11 is an explanatory view of an example of a frame format of a report signal;

FIG. 19 is a flowchart of the communication control according to the embodiment 3;

FIG. 23 is an explanatory view of an example of the sensing information;

FIG. 25 is an explanatory view of an example of a frame format of a report signal;

FIG. 26 is an explanatory view of an example of a frame format of a sensing information request signal;

FIG. 27 is an explanatory view of an example of a frame format of a sensing information reply signal;

FIG. 29 is a flowchart of the operation of the sensing information reply signal transmitting process;

FIG. 30 is a flowchart of the operation of the report signal transmitting process.

DESCRIPTION OF EMBODIMENTS

The embodiments of the wireless tag device are described below in detail with reference to the attached drawings.

[Embodiment 1]
[Wireless Tag Device]

Figure 1:
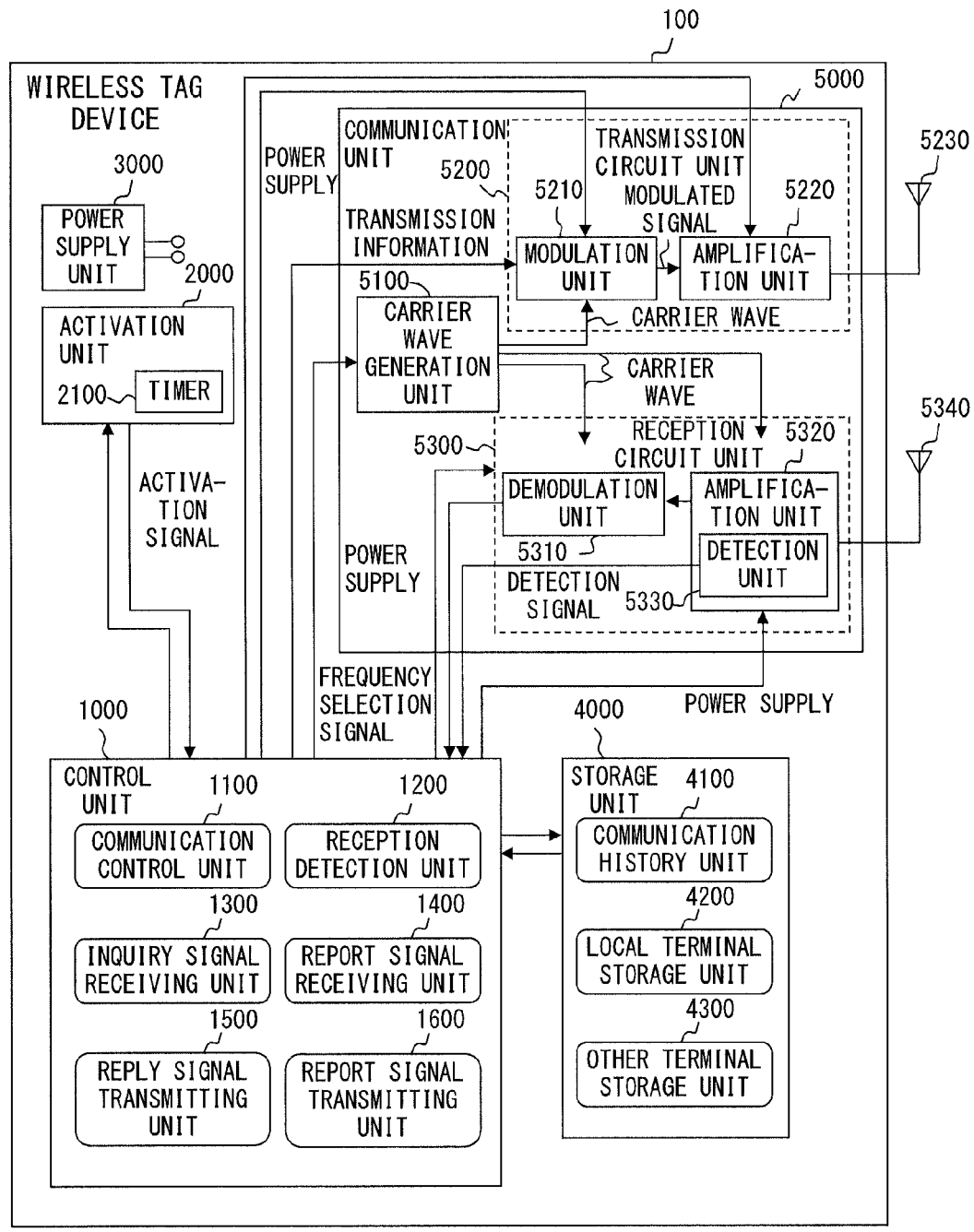
FIG. 1 is a block diagram of the function about the configuration of an embodiment of the wireless tag device.

FIG. 1 is a block diagram of the function about the configuration of an embodiment of the wireless tag device.

A wireless tag device 100 includes a control unit 1000, an activation unit 2000, a power supply unit 3000, a storage unit 4000, and a communication unit 5000.

The control unit 1000 can include a circuit for being activated according to an activation signal supplied from the activation unit 2000, and sequentially reading and executing the instruction sequence included in the program stored in the wireless tag device, thereby realizing each function unit of a communication control unit 1100, a reception detection unit 1200, an inquiry signal receiving unit 1300, a report signal receiving unit 1400, a reply signal transmitting unit 1500, and a report signal transmitting unit 1600. Furthermore, the wireless tag device 100 can embed circuits which realize each function unit of the communication control unit 1100, the reception detection unit 1200, the inquiry signal receiving unit 1300, the report signal receiving unit 1400, the reply signal transmitting unit 1500, and the report signal transmitting unit 1600.

The communication control unit 1100 is a component such as a program module, a circuit, etc. for operating the control unit 1000 for controlling the communicating process performed after activating the control unit 1000 when the activation signal is supplied.

The transmission detection unit 1200 is a component such as a program module, a circuit, etc. for operating the control unit 1000 for detecting whether or not the communication control unit 1100 has received a modulated signal in a specified frequency band by acquiring a detection signal from the communication unit 5000.

The inquiry signal receiving unit 1300 is a component such as a program module, a circuit, etc. for operating the control unit 1000 for performing the process of an inquiry signal from the inquiry device received by the communication unit 5000.

The report signal receiving unit 1400 is a component such as a program module, a circuit, etc. for operating the control unit 1000 for performing the process of an inquiry signal from another wireless tag device received by the communication unit 5000.

The reply signal transmitting unit 1500 is a component such as a program module, a circuit, etc. for operating the control unit 1000 for generating a reply signal to the inquiry signal and performing the transmitting process to the inquiry device using the communication unit 5000.

The report signal transmitting unit 1600 is a component such as a program module, a circuit, etc. for operating the control unit 1000 for performing the process of transmitting an inquiry signal to another wireless tag device 100 through the communication unit 5000.

The activation unit 2000 is provided with a timer 2100 for measuring the elapsed time, and transmits an activation signal to the control unit 1000 when the elapsed time measured using the timer 2100 satisfies the activation condition.

For example, the timer 2100 can be configured by a crystal oscillation circuit for counting the output of the crystal oscillator, and outputting a clock signal for each specified time (for example, 1 msec.).

The activation unit 2000 can be configured to count the clock signal output in a specified period from the timer 2100, and transmit the activation signal to the control unit 1000 when the count value exceeds a threshold set as the activation condition.

The power supply unit 3000 supply power to each of the control unit 1000, the activation unit 2000, the storage unit 4000, and the communication unit 5000 in the wireless tag device 100, and can be a button-shaped battery. The power of the power supply unit 3000 is configured to be supplied to at least the activation unit 2000 although the important part of the wireless tag device 100 such as the control unit 1000, the communication unit 5000, etc. is in an inactive state.

The storage unit 4000 is configured by a record medium to store information at a write request from the control unit 1000, read the information specified depending on a write request from the control unit 1000, and transmit the information to the control unit 1000.

The storage unit 4000 includes a communication history unit 4100, a local terminal storage unit 4200, and another terminal storage unit 4300.

The communication history unit 4100 is an area for storing the history information about the communication with the inquiry device.

Figure 2:
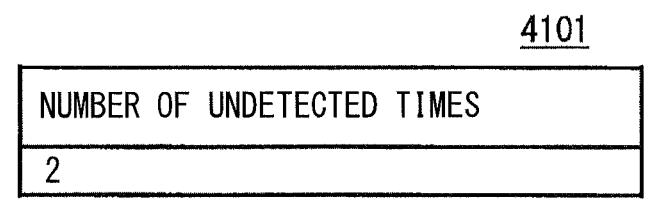

FIG. 2 is an explanatory view of an example of the history information stored in the communication history unit 4100.

In the example illustrated in FIG. 2, it is determined every specified time whether or not the inquiry signal from the inquiry device has been received, and stores in history information 4101 the number of times the inquiry signal from the inquiry device has not been continuously received as a number of undetected times. The example illustrated in FIG. 2 indicates that the number of times of not continuously receiving the inquiry signal from the inquiry device is two times.

As the history information stored in the communication history unit 4100, the information about the date and time of the transmission of a reply signal in response to the inquiry signal, the date and time of the transmission of a report signal to another wireless tag device 100, etc. can be stored.

The local terminal storage unit 4200 is an area for storing local terminal identification information set in the wireless tag device 100.

FIG. 3 is an explanatory view of an example of the local terminal identification information stored in the local terminal storage unit 4200.

Local terminal identification information 4201 stores the identification information for unique identification of the wireless tag device 100. In the example illustrated in FIG. 3, it stores terminal identification information "Tag 001" set in the local terminal.

The other terminal storage unit 4300 is an area for storing the information about another wireless tag device 100 received through the communication unit 5000.

FIG. 4 is an explanatory view of an example of the other terminal information stored in the other terminal storage unit 4300.

Other terminal identification information 4301 transmitted from another wireless tag device 100 can be defined as the other terminal information stored in the other terminal storage unit 4300. In the example illustrated in FIG. 4, it stores terminal identification information "Tag 002" transmitted from the other wireless tag device 100.

The communication unit 5000 includes a carrier wave generation unit 5100, a transmission circuit unit 5200, and a reception circuit unit 5300, transmits the information using a transmission wave in the frequency band specified by the control unit 1000, and receives the wave in the frequency band specified by the control unit 1000, thereby acquiring the information.

The carrier wave generation unit 5100 starts activation upon receipt of the power supply from the power supply unit 3000 under the control of the control unit 1000, and generates a corresponding carrier wave according to the frequency selection signal supplied from the control unit 1000. The carrier wave generation unit 5100 supplies the carrier wave generated under the control of the control unit 1000 to the transmission circuit unit 5200 and the reception circuit unit 5300.

The transmission circuit unit 5200 includes a modulation unit 5210, an amplification unit 5220, and a transmission antenna 5230.

The transmission circuit unit 5200 starts activation upon receipt of the power supply from the power supply unit 3000 under the control of the control unit 1000, defines a modulated signal obtained by modulating the transmission signal supplied from the control unit by the modulation unit 5210, amplifies the modulated signal by the amplification unit 5220, and transmits it through the transmission antenna 5230.

The modulation unit 5210 modulates the oscillation signal supplied from the carrier wave generation unit 5100 in a specified modulation system according to the transmission signal transmitted from the control unit 1000, and supplies the modulated signal to the amplification unit 5220.

The amplification unit 5220 amplifies the modulated signal supplied from the modulation unit 5210 based on the amplification level specified by the control unit 1000, and outputs the resultant signal to the transmission antenna 5230.

The reception circuit unit 5300 includes a demodulation unit 5310, an amplification unit 5320, a detection unit 5330, and a reception antenna 5340.

The reception circuit unit 5300 starts activation upon receipt of the power supply from the power supply unit 3000 under the control of the control unit 1000, receives a modulated signal transmitted from another device using the reception antenna 5340, detects whether or not an modulated signal in the frequency band specified by the control unit 1000 has been received, demodulate the modulated signal if it is in the specified frequency band, and transmits the obtained information to the control unit 1000.

The amplification unit 5320 amplifies the signal supplied from the reception antenna 5340, and supplies the amplified signal to the detection unit 5330.

The detection unit 5330 detects whether or not there is a modulated signal in the frequency band specified by the control unit 1000 in the signals supplied from the amplification unit 5320, and transmits the detection result to the control unit 1000.

When the detection unit 5330 detects that the modulated signal in the frequency band specified by the control unit 1000 has been received, the demodulation unit 5310 is activated upon receipt of the power supply from the power supply unit 3000 under the control of the control unit 1000. When the demodulation unit 5310 is activated upon receipt of the power supply from the power supply unit 3000, it demodulates the modulated signal amplified by the amplification unit 5320 in a specified modulation system, and transmits the signal as a received signal to the control unit 1000.

The modulation system used in modulating and demodulating processes by the modulation unit 5210 and the demodulation unit 5310 is not specifically restricted, but can be a conventional modulation system such as a amplification modulation system, a frequency modulation system, a phase modulation system, etc.

[Inquiry Device]

To recognize the existence of the above-mentioned wireless tag device 100, an inquiry device for transmitting an inquiry signal at a specified frequency to a plurality of wireless tag devices 100 and receiving a reply signal from each of the wireless tag devices 100 is provided at a specified position.

Figure 5:
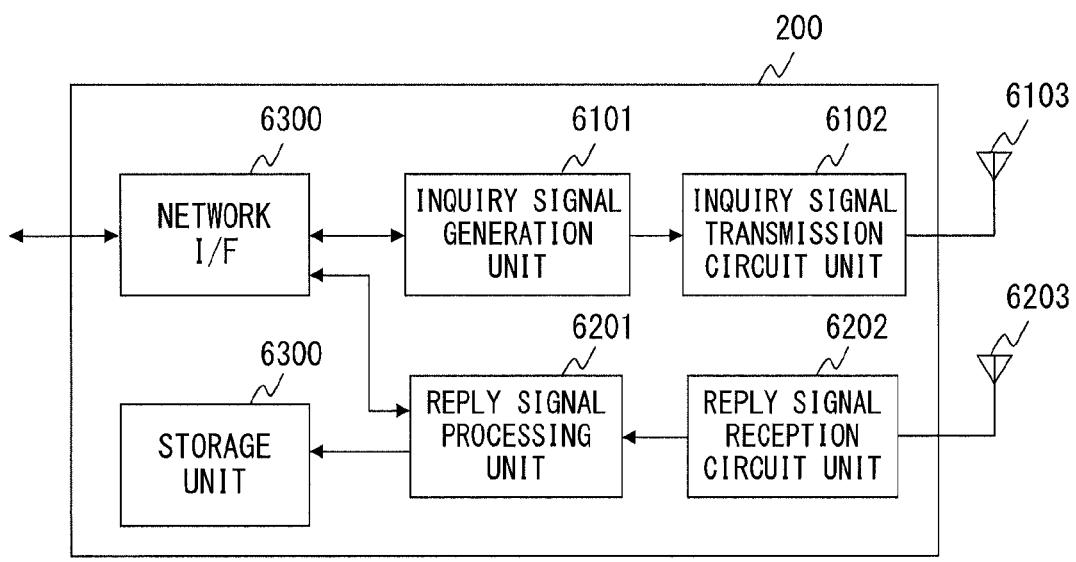
FIG. 5 is a block diagram of the function indicating an example of an inquiry device.

FIG. 5 is a block diagram of the function indicating an example of an inquiry device.

An inquiry device 200 is configured by a computer system provided with a CPU, ROM, RAM, etc., has each function unit by executing a program stored in memory, and performs an information process.

The inquiry device 200 includes as its function units an inquiry signal generation unit 6101, an inquiry signal transmission circuit unit 6102, a transmission antenna 6103, a reply signal processing unit 6201, a reply signal reception circuit unit 6202, a reception antenna 6203, a network interface 6300, a storage unit 6400, etc.

The inquiry signal generation unit 6101 generates an inquiry signal to be transmitted to the wireless tag device 100.

The inquiry signal generation unit 6101 generates the following inquiry information, and generates an inquiry signal based on the information.

FIG. 6 is an explanatory view of an example of a frame format of an inquiry signal.

The inquiry signal illustrated in FIG. 6 includes a start code, a signal type code, an error correction code, and an end code.

The start code indicates a starting point of the frame format of the inquiry signal.

The signal type code indicates the signal type of transmission data.

The error correction code indicates a code for detection of a corresponding code error and correction of the error when there occurs a code error in the transmitted data. The error correction code can be replaced with an error detection code having no correcting function.

The end code indicates an end point of the frame format of the inquiry signal.

The inquiry signal generation unit 6101 stores a code as an inquiry signal in the signal type code of the inquiry signal, and generates inquiry information.

The inquiry signal transmission circuit unit 6102 modulates the carrier wave of a specified frequency band in a specified modulation system based on the inquiry information generated by the inquiry signal generation unit 6101, and transmits the carrier wave through the transmission antenna 6103.

The reply signal reception circuit unit 6202 demodulates a modulated signal of a specified frequency band received through the reception antenna 6203 in a specified modulation system, and transmits the signal to the reply signal processing unit 6201.

The reply signal processing unit 6201 detects the inquiry information about the wireless tag device wireless tag device 100 included in the demodulated reply signal, stores it in the storage unit 6400, and transmits data to the host computer (not illustrated in the attached drawings) through the network interface 6300.

FIG. 7 is an explanatory view of an example of a frame format of a reply signal.

The reply signal illustrated in FIG. 7 includes a start code, a signal type code, the number of pieces of data, terminal identification information, an error correction code, and an end code.

The start code indicates the starting point of the frame format of the reply signal.

The signal type code indicates the signal type of a received signal.

The number of pieces of data indicates the number of pieces of subsequent terminal identification information. The wireless tag device 100 can be configured to transmit the local terminal identification information stored in the local terminal storage unit 4200 and the other terminal identification information stored in the other terminal storage unit 4300 in the reply signal. When the terminal identification information included in the reply signal is only local terminal identification information, the number of pieces of data of the reply signal is "1", and when the information includes a piece of other terminal identification information in addition to the local terminal identification information, "2" is stored.

The terminal identification information indicates the local terminal identification information stored in the local terminal storage unit 4200 and the other terminal identification information stored in the other terminal storage unit 4300. The terminal identification information included in the reply signal includes the terminal identification information of the number stored in the number of pieces of data.

The error correction code indicates a code for correction of a corresponding code error when there occurs a code error in the received data. The error correction code can be replaced with an error detection code having no correcting function.

The end code indicates the end point of the frame format of the reply signal.

The reply signal processing unit 6201 can store the terminal identification information included in the reply signal or transmit it to the host computer through the network interface 6300.

Like the wireless tag device 100, the modulation and demodulation systems of the inquiry signal transmission circuit unit 6102 and the reply signal reception circuit unit 6202 can be an amplification modulation system, a frequency modulation system, a phase modulation system, and other conventional modulation systems, and is not specifically restricted.

[Wireless Tag System]

FIG. 8 is an explanatory view of the outline of the process in the wireless tag system which communicates information with a plurality of wireless tag devices 100 and an inquiry device using a radio signal.

Described in this example is a wireless tag system provided with the inquiry device 200 and a plurality of wireless tag devices 100A through 100D.

The inquiry device 200 transmits an inquiry signal A100 through the inquiry signal transmission circuit unit 6102. The example illustrated in FIG. 8 indicates that the wireless tag devices 100A through 100C have received the inquiry signal A100 transmitted from the inquiry device 200, and the wireless tag device 100D has not received the inquiry signal A100 transmitted from the inquiry device 200.

Upon receipt of the inquiry signal A100 from the inquiry device 200, the wireless tag devices 100A through 100C transmit reply signals A101-1 through A101-3 corresponding to the inquiry signal A100. The reply signals A101-1 through A101-3 transmitted by the wireless tag devices 100A through 100C include the local terminal identification information about the wireless tag devices 100A through 100C respectively.

The wireless tag device 100D which has not received the inquiry signal A100 from the inquiry device 200 transmits a report signal A102 from the inquiry device 200 through the report signal transmitting unit 1600. The wireless tag device 100D can be configured to transmit the report signal A102 when the inquiry signal from the inquiry device 200 cannot be continuously received for a specified time. In this case, the report signal A102 includes the local terminal identification information about the wireless tag device 100D.

The example illustrated in FIG. 8 indicates that the wireless tag devices 100B and 100C have received the report signal A102 transmitted from the wireless tag device 100D.

The inquiry device 200 transmits the inquiry signal in a specified time period, and transmits the next inquiry signal A103 when a specified time has passed after the inquiry signal A100 is transmitted. In this case, it is also indicated that the wireless tag devices 100A through 100C receive the inquiry signal A103 transmitted from the inquiry device 200, and the wireless tag device 100D has not received the inquiry signal A103 transmitted from the inquiry device 200.

The wireless tag devices 100A through 100C which have received the inquiry signal A103 from the inquiry device 200 transmit the reply signals A104-1 through A104-3 corresponding to the inquiry signal A103.

The reply signal A104-1 transmitted by the wireless tag device 100A includes the local terminal identification information about the wireless tag device 100A. Furthermore, the reply signals A104-2 and A104-3 transmitted by the wireless tag devices 100B and 100C includes in addition to the local terminal identification information about the wireless tag devices 100B and 100C respectively the terminal identification information about the wireless tag device 100D included in the report signal received from the wireless tag device 100D as other terminal identification information.

[Operation of the Activation Unit of Wireless Tag Device]

Figure 9:
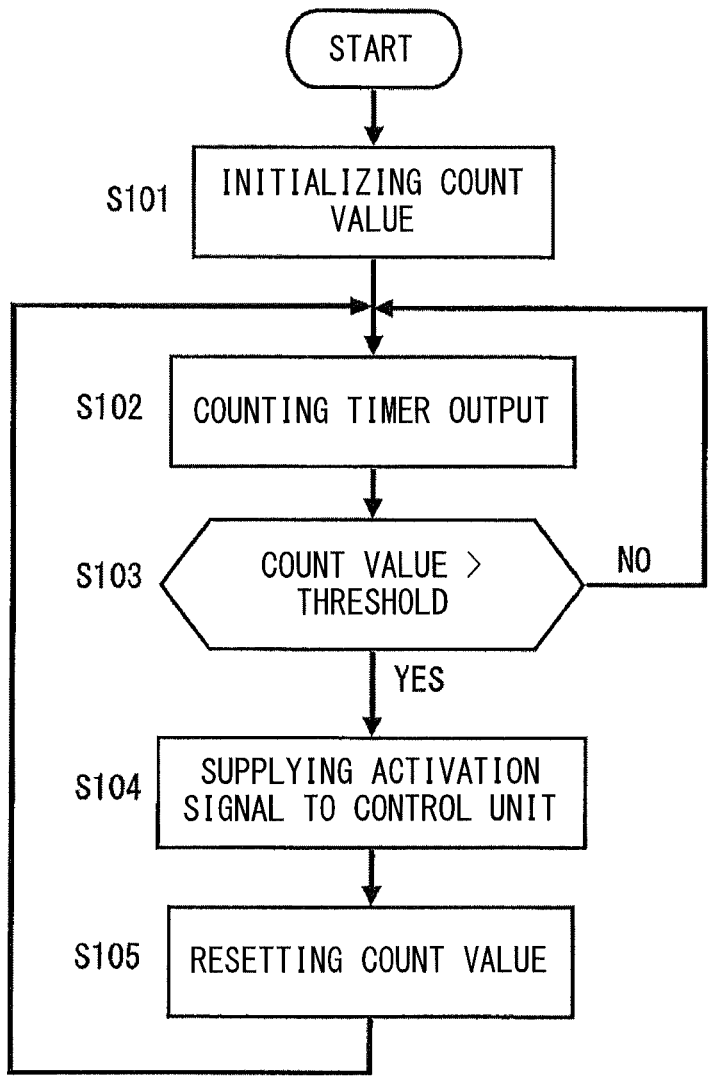
FIG. 9 is a flowchart of the operation of the wireless tag device in the activation unit.

FIG. 9 is a flowchart of the operation of the wireless tag device 100 in the activation unit 2000.

The wireless tag device 100 includes the power supply unit 3000 and exemplifies an active system. To save the power from the power supply unit 3000, it is preferable that the wireless tag device 100 of the active system is configured to be normally in the inactive state and power is supplied to each component from the power supply unit 3000 when a specified condition is satisfied.

When the activation unit 2000 starts its operation, it initializes the count value output from the built-in timer 2100 (step S101).

The activation unit 2000 counts the output from the timer 2100 (step S102), and determines whether or not the count value has exceeded a specified threshold (step S103).

It is preferable that the wireless tag device 100 receives an inquiry signal transmitted from the inquiry device 200 every specified time, and transmits a corresponding reply signal, and the specified threshold to be compared with the count value is set as a value exceeding the time interval of the inquiry signal transmitted by the inquiry device 200.

The activation unit 2000 repeatedly performs the processes in steps S102 and S103 when it determines that the count value does not exceed the specified threshold, and passes control to step S104 when it determines that the count value has exceeded the specified threshold.

In step S104, the activation unit 2000 transmits an activation signal to the control unit 1000.

In step S105, the activation unit 2000 resets the count value, and passes control to step S102.

[Operation Of Control Unit 1000 of Wireless Tag Device 100]

Figure 10:
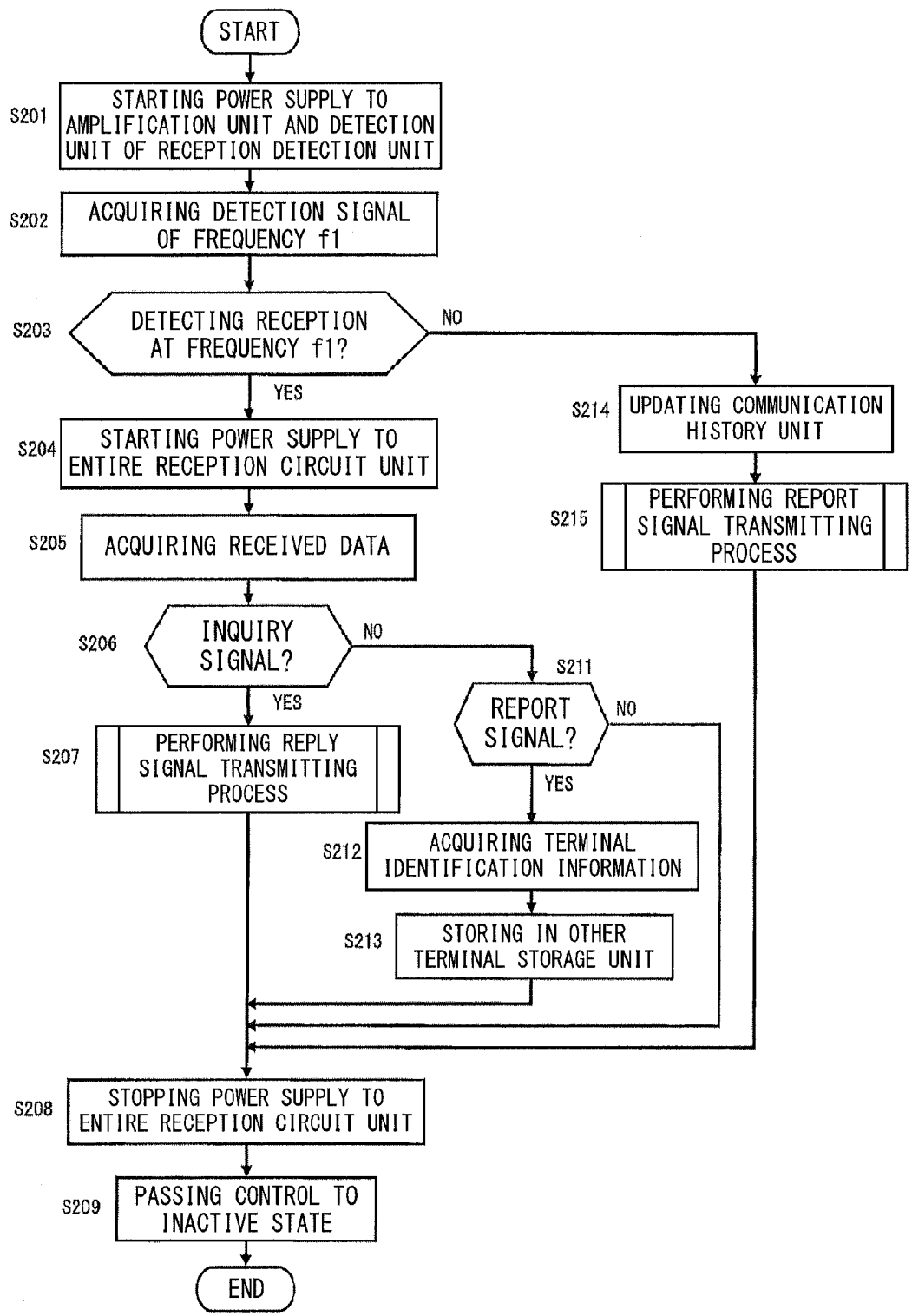
FIG. 10 is a flowchart of the operation of the wireless tag device in the control unit.

FIG. 10 is a flowchart of the operation of the wireless tag device 100 in the control unit 1000.

Upon receipt of the activation signal from the activation unit 2000, the control unit 1000 in the wireless tag device 100 starts receiving the power supply from the power supply unit 3000, and starts its operation.

In step S201, upon receipt of the activation signal from the activation unit 2000, the control unit 1000 starts to supply power to the amplification unit 5320 and the detection unit 5330 of the reception circuit unit 5300.

In step S202, the control unit 1000 acquires from the detection unit 5330 a detection signal informing that the reception circuit unit 5300 has received a modulated signal which has been modulated at a first frequency band of a frequency f1. If the signal received by the reception circuit unit 5300 is the modulated signal which has been modulated at the frequency f1, the detection unit 5330 transmits the detection signal to the control unit 1000.

In step S203, the control unit 1000 passes control to step S204 if the detection signal informing that the modulated signal which has been modulated at the frequency f1 has been acquired from the detection unit 5330, and passes control to step S219 otherwise.

In step S204, the control unit 1000 starts supplying power to the entire reception circuit unit 5300. In this example, the control unit 1000 starts supplying power from the power supply unit 3000 to the demodulation unit 5310 of the reception circuit unit 5300.

In step S205, the control unit 1000 acquires received data acquired by demodulating the modulated signal by the demodulation unit 5310 of the reception circuit unit 5300.

In step S206, the control unit 1000 determines the received data acquired by the demodulation by the demodulation unit 5310 of the reception circuit unit 5300 refers to an inquiry signal.

The frame format of the inquiry signal has a configuration as illustrated in FIG. 6. The control unit 1000 refers to the signal type code of the received data, and if it determines that the signal type code indicates an inquiry signal, it passes control to step S207. If it determines that the signal type code does not indicate an inquiry signal, it passes control to step S211.

In step S207, the control unit 1000 performs the reply signal transmitting process if it determines that the signal type code of the received data indicates an inquiry signal.

After performing the reply signal transmitting process in step S207, the control unit 1000 stops supplying power to the reception circuit unit 5300 in step S208.

In step S209, the control unit 1000 stops supplying power from the power supply unit 3000, and stops the process until receiving the next activation signal from the activation unit 2000.

By performing the process in step S208, the reception circuit unit 5300 is activated while the process by the reception circuit unit 5300 is being performed, thereby reducing the power consumption in the reception circuit unit 5300.

Furthermore, by performing the process in step S209, the wireless tag device 100 can be activated every specified time based on the count value counted by the activation unit 2000, thereby reducing the power consumption.

The steps S208 and S209 can be omitted.

In step S206, if the control unit 1000 determines that the signal type code of the received data does not indicate an inquiry signal, it determines whether or not the signal type code of the received data indicates a report signal in step S211.

FIG. 11 is an explanatory view of an example of a frame format of a report signal.

The signal illustrated in FIG. 11 includes a start code, a signal type code, a terminal identification information, an error correction code, and an end code.

The start code indicates a starting point of the frame format of a report signal.

The signal type code indicates the signal type of the signal.

The terminal identification information stores the terminal identification information stored in the local terminal storage unit 4200 of the wireless tag device 100 which transmits the report signal.

The error correction code is a code for correction of a corresponding code error when a code error occurs in received data. The error correction code can be replaced with an error detection code having no correcting function.

The end code indicates an end point of the frame format of a report signal.

The control unit 1000 passes control to step S212 when it refers to the signal type code of the received signal and determines that the signal type code indicates a report signal, and passes control to step S208 otherwise.

In step S212, the control unit 1000 acquires the terminal identification information included in the received data, and in step S213, the control unit 1000 stores the terminal identification information acquired in the other terminal storage unit 4300 of the storage unit 4000. Afterwards, the control unit 1000 performs the processes in steps S208 and S209, and enters an inactive state.

If the control unit 1000 determines in step S211 that the signal type code of the received data does not indicate a report signal, it performs the processes in steps S208 and S209, and places the wireless tag device 100 in the inactive state.

If the control unit 1000 does not acquire from the detection unit 5330 the detection signal informing that the modulated signal which has been modulated at the frequency f1 in step S203, then it passes control to step S214, and updates the data stored in the communication history unit 4100 of the storage unit 4000. As illustrated in FIG. 2, the communication history unit 4100 of the storage unit 4000 is configured to store in the history information 4101 the number of times of not receiving an inquiry signal from the inquiry device 200 as a non-detection frequency.

In step S214, the control unit 1000 updates the history information 4101 after adding 1 to the value of the non-detection frequency stored as the history information 4101.

In step S215, the control unit 1000 performs the report signal transmitting process.

In the report signal transmitting process in step S215, the control unit 1000 generates a report signal having the local terminal identification information stored in the local terminal storage unit 4200 of the storage unit 4000 when a specified report signal transmission condition is satisfied, and transmits the signal to another wireless tag device 100. The wireless tag device 100 which has received the report signal stores the terminal identification information acquired and stored in the other terminal storage unit 4300 of the storage unit 4000 in the processes in steps S211 through S213, and transmits to the inquiry device 200 the terminal identification information stored together with the local terminal identification information in the other terminal storage unit 4300 in the reply signal transmitting process in step S207.

Thus, The wireless tag device 100 which could not receive the inquiry signal from the inquiry device 200 can transmit the local terminal identification information to the inquiry device 200 through another wireless tag device 100.

After performing the report signal transmitting process in step S215, the control unit 1000 performs the processes in steps S208 and S209, and places the wireless tag device 100 in the inactive state.

[Reply Signal Transmitting Process]

Figure 12:
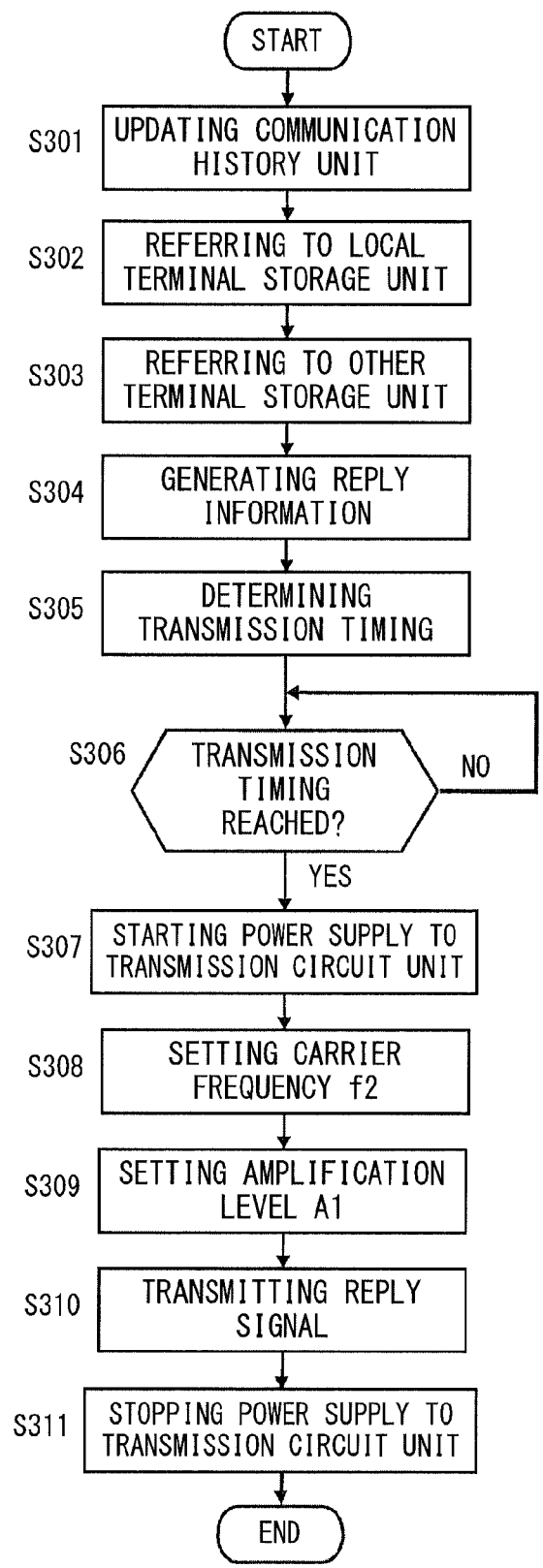
FIG. 12 is a flowchart of the reply signal transmitting process.

FIG. 12 is a flowchart of the reply signal transmitting process in step S207 illustrated in FIG. 10.

When the control unit 1000 starts the reply signal transmitting process, it updates the communication history unit 4100 of the storage unit 4000 in step S301. The control unit 1000 updates the history information 4101 (refer to FIG. 2) stored in the communication history unit 4100 of the storage unit 4000, and resets to 0 the value of the non-detection frequency in the history information 4101. Thus, the control unit 1000 resets the non-detection frequency indicating that the wireless tag device 100 could not receive the inquiry signal transmitted from the inquiry device 200.

In step S302, the control unit 1000 refers to the local terminal storage unit 4200 of the storage unit 4000, and acquires the local terminal identification information. In step S303, the control unit 1000 refers to the other terminal storage unit 4300 of the storage unit 4000, and acquires the other terminal identification information if the other terminal identification information exists.

In step S304, the control unit 1000 generates the reply information as a reply signal according to the local terminal identification information and the other terminal identification information acquired by referring to the storage unit 4000.

For example, as illustrated in FIG. 3, if the contents of the local terminal identification information 4201 stored in the local terminal storage unit 4200 of the storage unit 4000 refer to "Tag 001" and the contents of the other terminal identification information 4301 stored in the other terminal storage unit 4300 of the storage unit 4000 refer to "Tag 002" as illustrated in FIG. 4, then the control unit 1000 acquires "Tag 001" as the local terminal identification information and "Tag 002" as the other terminal identification information, and defines the information as the reply information as the contents of the reply signal.

As described above, the frame format of the reply signal has the configuration as illustrated in FIG. 7.

If the terminal identification information acquired from the storage unit 4000 refers to the local terminal identification information only, then the control unit 1000 generates reply information including "1" as the number of pieces of data and storing only the local terminal identification information as the terminal identification information. If the terminal identification information acquired from the storage unit 4000 includes the other terminal identification information in addition to the local terminal identification information, then the control unit 1000 sets a corresponding value as the number of pieces of data, and generates the reply information including the local terminal identification information and the other terminal identification information for the number of pieces of data as the terminal identification information. In addition, the control unit 1000 sets a code indicating a reply signal in the signal type code, thereby generating reply information.

In step S305, the control unit 1000 determines the transmission timing of the reply signal. The control unit 1000 can be configured to determine the transmission timing of the reply signal based on the delay time set in advance. To avoid the interference with the reply signal transmitted by another wireless tag device 100, the control unit 1000 can be configured to determine the delay time based on the random number, thereby determining the transmission timing of the reply signal.

In step S306, the control unit 1000 determines whether or not the transmission timing of the reply signal determined in display S305 has been reached. For example, the control unit 1000 can be configured to determine whether or not the transmission timing of the reply signal has been reached by counting the elapsed time using a timer. The control unit 1000 enters a standby state in step S306 until the transmission timing of the reply signal is reached, and when it determines that the transmission timing of the reply signal has been reached, it passes control to step S307.

In step S307, the control unit 1000 starts supplying power from the power supply unit 3000 to the reception circuit unit 5300.

In step S308, the control unit 1000 sets the frequency used as a carrier wave of a reply signal. The control unit 1000 can set the carrier frequency of a reply signal as a frequency f2 different from the carrier frequency of an inquiry signal.

In step S309, the control unit 1000 sets an amplification level A1 in the amplification unit 5220.

In step S310, the control unit 1000 transmits a reply signal to the communication unit 5000. In this example, the control unit 1000 transmits the reply information generated based on the terminal identification information to the transmission circuit unit 5200, transmits the carrier frequency f2 set in step S308 to the carrier wave generation unit 5100, and transmits the amplification level A1 to the amplification unit 5220. Thus, the modulation unit 5210 generates a modulated signal based on the reply information transmitted from the control unit 1000 the signal at the carrier frequency f2 supplied from the carrier wave generation unit 5100, and transmits the generated signal to the amplification unit 5220. The amplification unit 5220 amplifies the modulated signal supplied from the modulation unit 5210 based on the amplification level A1 set by the control unit 1000, and transmits the signal through the transmission antenna 5230.

In step S311, the control unit 1000 stops supplying power from the power supply unit 3000 to the transmission circuit unit 5200. Thus, after completing the transmitting process of the reply signal from the transmission circuit unit 5200, the power supply to the transmission circuit unit 5200 is stopped, thereby reducing the power consumption. The process in step S311 can also be omitted.

[Report signal Transmitting Process]

Figure 13:
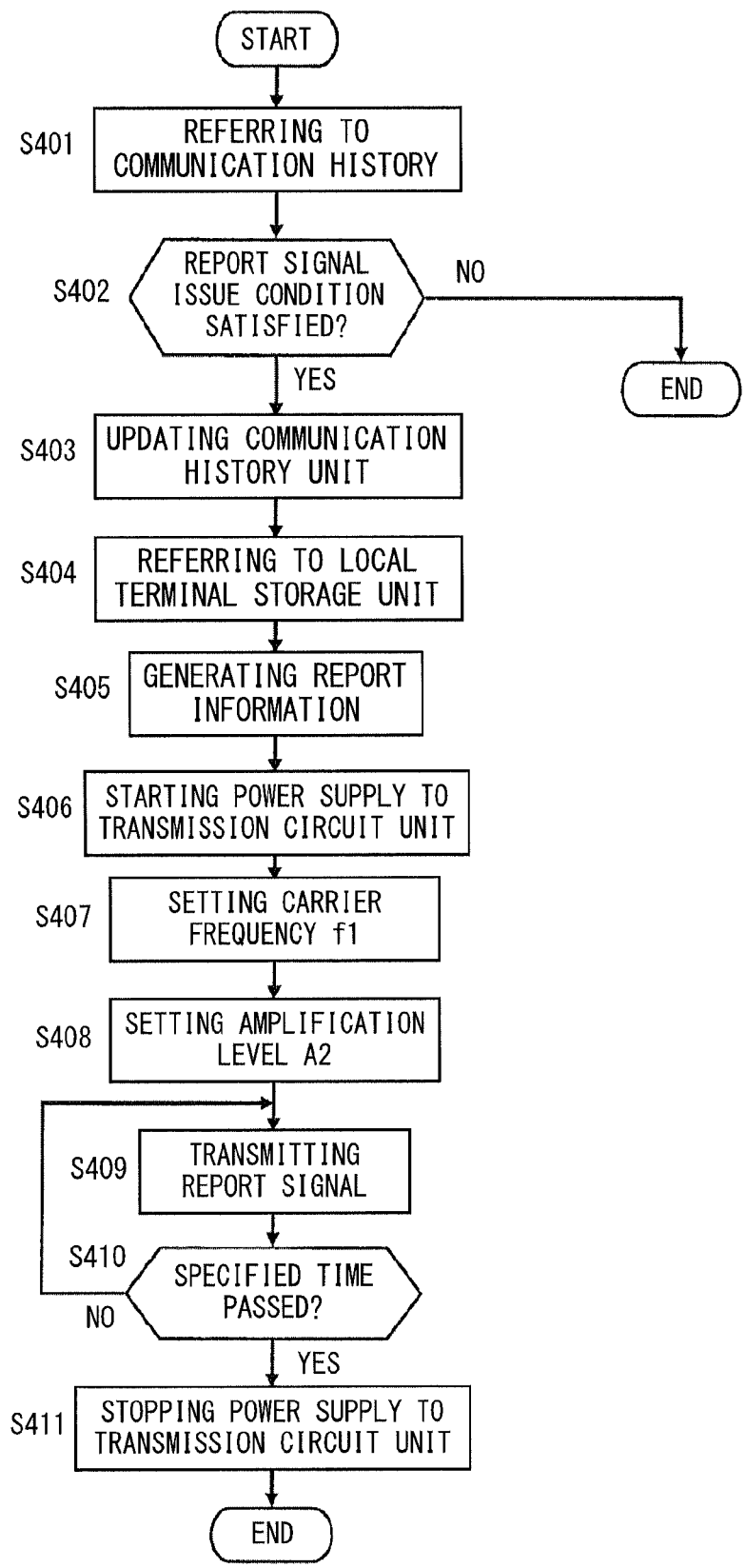
FIG. 13 is a flowchart of the report signal transmitting process.

FIG. 13 is a flowchart of the report signal transmitting process in step S215 illustrated in FIG. 10.

When starting the report signal transmitting process, the control unit 1000 refers to the communication history unit 4100 in step S401. The control unit 1000 acquires the number of undetected times of the history information 4101 (refer to FIG. 2) stored in the communication history unit 4100 of the storage unit 4000.

In step S402, the control unit 1000 determines whether or not the number of undetected times of the history information 4101 satisfies the report signal transmitting condition set in advance. As the report signal transmitting condition, it is possible to set a report signal so that it can be transmitted when the number of undetected times of the history information 4101 exceeds a specified number of times. In this case, the control unit 1000 passes control to step S403 when it determines that the number of undetected times of the history information 4101 has exceeded the specified number of times, and terminates the report signal transmitting process otherwise. For example, if "4" is set as a specified number of times, and the number of undetected times of the history information 4101 is "2" as illustrated in FIG. 2, then the control unit 1000 compares the number of undetected times "2" acquired from the 4101 with a specified number of times "4" set in advance. In this case, since the number of undetected times does not exceed a specified number of times, the control unit 1000 terminates the report signal transmitting process.

In step S403, the control unit 1000 updates the history information 4101 stored in the communication history unit 4100. In this example, the control unit 1000 sets the number of undetected times of the history information 4101 to "0", and updates the history information 4101.

In step S404, the control unit 1000 refers to the local terminal storage unit 4200, and acquires the local terminal identification information 4201 stored in the local terminal storage unit 4200.

In step S405, the control unit 1000 generates report information as a report signal according to the acquired local terminal identification information 4201.

The frame format of the report signal is configured as, for example, illustrated in FIG. 11. The control unit 1000 stores the local terminal identification information 4201 acquired in step S404 in the terminal identification information column in the frame format of the report signal, and generates report information by storing the code as a report signal in the signal type code.

In step S406, the control unit 1000 starts supplying power from the power supply unit 3000 to the transmission circuit unit 5200.

In step S407, the control unit 1000 sets the carrier frequency f1 in the carrier wave generation unit 5100.

In step S408, the control unit 1000 sets an amplification level A2 in the amplification unit 5220 of the transmission circuit unit 5200. The amplification level A2 set in the amplification unit 5220 of the communication unit 5000 can be lower than the amplification level A1 in the reply signal transmitting process. When the inquiry signal from the inquiry device 200 cannot be acquired, the wireless tag device 100 transmits the report signal to another wireless tag device 100 in the vicinity, and it is not always necessary to reach the inquiry device 200. Therefore, by setting the transmission power in outputting the report signal from the wireless tag device 100 lower than the transmission power in outputting the reply signal, the reach of the report signal is shorter than the reach of the reply signal. However, the power consumption of the wireless tag device 100 can be successfully reduced.

In step S409, the control unit 1000 transmits to the modulation unit 5210 of the transmission circuit unit 5200 the generated report information. The modulation unit 5210 generates a modulated signal as a report signal according to the report information which is transmitted from the control unit 1000 and the oscillation signal at the frequency f1 transmitted from the carrier wave generation unit 5100, and transmits the modulated signal to the amplification unit 5220. The amplification unit 5220 amplifies the modulated signal supplied from the modulation unit 5210 based on the amplification level A2 transmitted from the control unit 1000, and transmits the amplified signal as a report signal through the transmission antenna 5230.

In step S410, the control unit 1000 determines whether or not a specified time has passed after starting the transmission of the report signal. The control unit 1000 counts the count value of the timer after starting the transmission of the report signal, and determines that the specified time has not passed and enters the standby state in step S409 if a specified count value has not been exceeded, and passes control to step S411 after determining that the specified time has passed if the count value of the timer has exceeded the specified value after starting the transmission of the report signal.

In step S411, the control unit 1000 stops the power supply from the power supply unit 3000 to the transmission circuit unit 5200.

Figure 14:
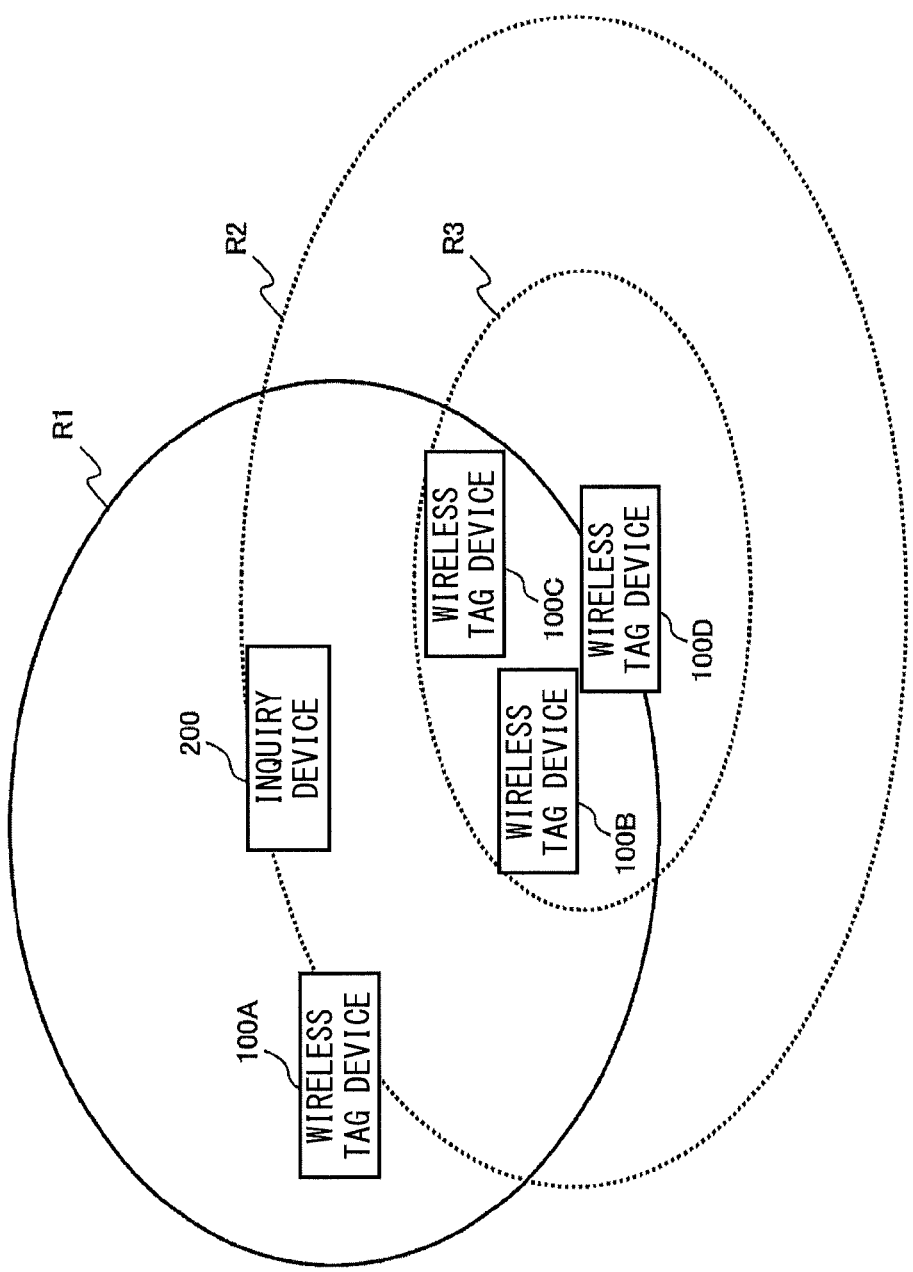
FIG. 14 is an explanatory view of an example of the arrangements of the wireless tag device and the inquiry device.

FIG. 14 is an explanatory view of an example of the arrangements of the wireless tag device and the inquiry device.

In the example illustrated in FIG. 14, the inquiry device 200 and a plurality of wireless tag devices 100A through 100D are arranged.

In FIG. 14, the reach of the report signal transmitted from the inquiry device 200 is expressed as a first area R1.

The wireless tag devices 100A through 100C are located in the first area R1, and can receive an inquiry signal transmitted from the inquiry device 200.

On the other hand, the wireless tag device 100D is located on the boundary of the first area R1, and placed in the position in which it is hard to receive the inquiry signal from the inquiry device 200.

When the wireless tag device 100D can receive an inquiry signal from the inquiry device 200, the reach of the reply signal transmitted by the wireless tag device 100D is defined as a second area R2.

Thus, it is necessary to increase the output and extend the reach of the inquiry signal transmitted to search all wireless tag devices 100A through 100D from the inquiry device 200, and it is also necessary to increase the output and extend the reach of the reply signal transmitted from the wireless tag devices 100A through 100D. When the wireless tag devices 100A through 100D are in the active system or the hybrid system for driving a battery, it is preferable to minimize the power consumption to reduce the waste of a battery. Therefore, as illustrated in FIG. 14, it is not preferable to increase the output of a transmission signal for communications for the wireless tag device 100D having difficulty in communicating with the inquiry device 200.

Thus, to the wireless tag device 100D which has not received the inquiry signal from the inquiry device 200, a report signal is transmitted to other wireless tag devices 100A through 100C. In this case, the output of the report signal is adjusted so that the reach of the report signal transmitted from the wireless tag device 100D can be a third area R3. It is necessary for the wireless tag device 100D to output a transmission signal whose reach is the second area R2 when a normal reply signal is transmitted. On the other hand, according to the present embodiment, the wireless tag device 100D can transmit the local terminal identification information to the inquiry device 200 through other wireless tag devices 100B and 100C by transmitting a report signal having the reach of the third area R3 which allows the reach to the wireless tag device 100B or 100C in the vicinity. Therefore, when the wireless tag device 100D uses the active system or the hybrid system for driving a battery, the transmission power of the report signal can be reduced, thereby reducing the consumption of the battery.

[Signal Transmission/Reception Timing]

Figure 15:
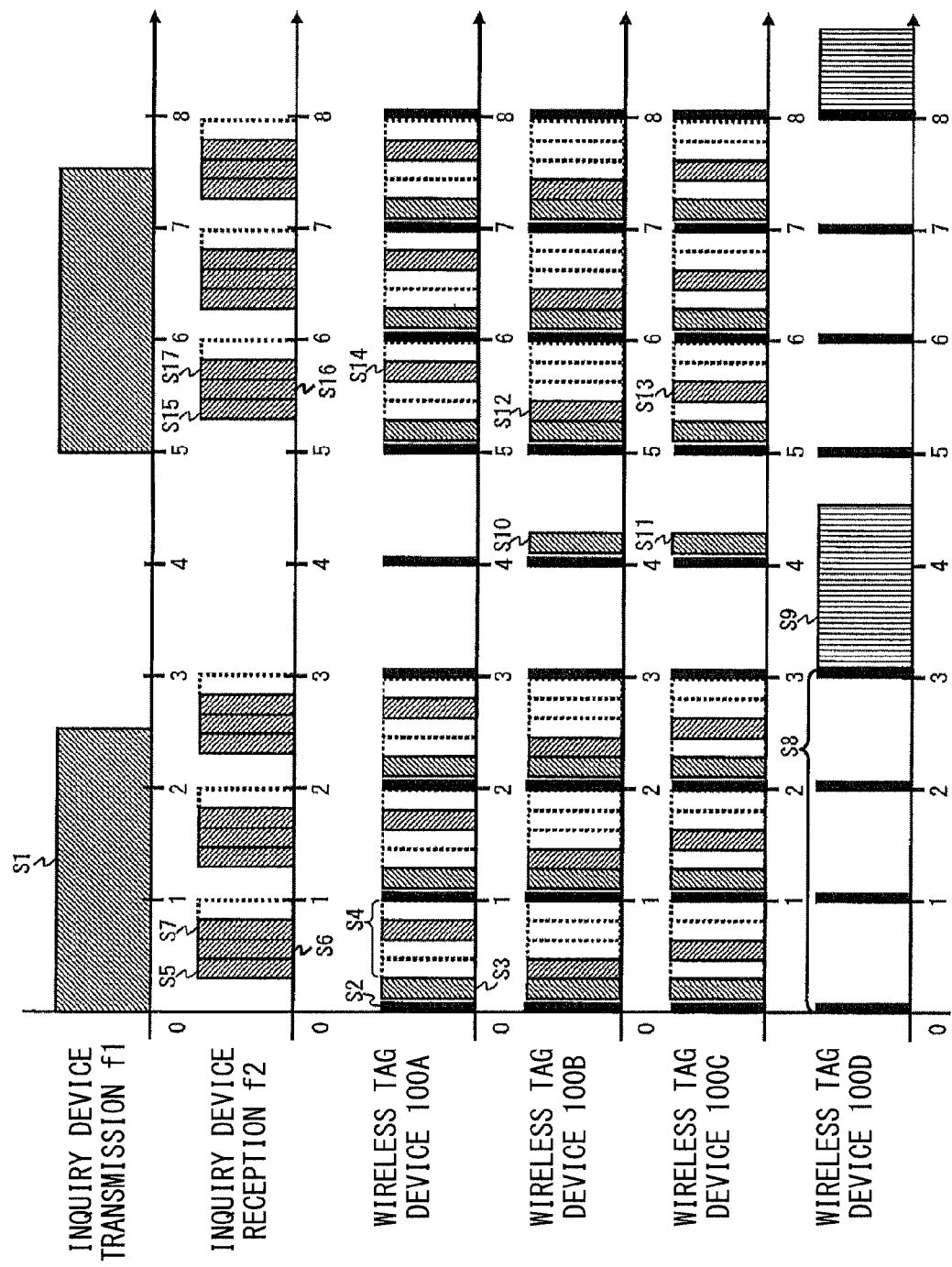
FIG. 15 is an explanatory view of the timing of transmitting and receiving a signal according to the embodiment 1.

FIG. 15 is an explanatory view of the timing of transmitting and receiving a signal according to the present embodiment.

In FIG. 15, the signal transmission/reception timing in each device is expressed using the horizontal axis as a time axis. The unit expressed by the horizontal axis can be, for example, a second (sec.), but it is not limited to this example.

The inquiry device 200 repeatedly transmits an inquiry signal using a frequency band of the carrier frequency f1 for a specified period. In the example in FIG. 15, the inquiry device 200 repeatedly transmits the inquiry signal to in the in the period of 0 through 2.5 seconds (S1). The inquiry device 200 then stops the reception of the inquiry signal in the period of 2.5 through 5 seconds, and repeatedly transmits the inquiry signal in the in the period of 5 through 7.5 seconds.

The wireless tag devices 100A through 100D performs the reception detecting process using the same frequency band as the carrier frequency f1 used when the inquiry signal is transmitted by the inquiry device 200. Each of the wireless tag devices 100A through 100D performs the reception detecting process on the inquiry signal with the timing S2.

Upon receipt of the inquiry signal transmitted by the inquiry device 200 as a result of the wireless tag devices 100A through 100D performing the reception detecting process, the inquiry signal is received with the timing S3. In the example illustrated in FIG. 15, the wireless tag devices 100A through 100C receive the inquiry signal from the inquiry device 200 with the timing S3, and the wireless tag device 100D fails in receiving the inquiry signal from the inquiry device 200.

The wireless tag devices 100A through 100D repeatedly perform the reception detecting process at intervals of 1 second as illustrated in FIG. 15. Among the devices, the wireless tag devices 100A through 100C detect the inquiry signal three times at 0, 1, and 2 seconds, thereby receiving the inquiry signal.

After the wireless tag devices 100A through 100C receive the inquiry signal from the inquiry device 200, they transmit a reply signal at any time S4 before performing the next reception detecting process.

The reply signal is modulated at the carrier frequency f2 different from the carrier frequency f1 of the inquiry signal from the inquiry device 200.

The transmission timing of the reply signal can be determined using random numbers to prevent the reply signals transmitted by the plurality of wireless tag devices 100A through 100C from interfering with one another.

The inquiry device 200 receives the reply signals transmitted by the wireless tag devices 100A and 100B with the respective timing. In the example illustrated in FIG. 15, the inquiry device 200 receives the reply signal transmitted by the wireless tag device 100B with the timing S5, receives the reply signal transmitted by the wireless tag device 100C with the timing S6, and receives the reply signal transmitted by the wireless tag device 100A with the timing S7. In the period of 1 through 3 seconds, the inquiry device 200 similarly receives the reply signals from the wireless tag devices 100A through 100C with the respective timing.

The wireless tag device 100D performs the reception detecting process with the timing S8 in the period of 0 through 3 seconds, but cannot receive the inquiry signal of the inquiry device 200. Therefore, the wireless tag device 100D cannot transmit the reply signal in response to the signal from the inquiry device 200, and the inquiry device 200 cannot detect the existence of the wireless tag device 100D.

The wireless tag device 100D is configured to transmit a report signal including the local terminal identification information to other wireless tag devices 100A through 100C in a specified period S9 when it cannot receive the inquiry signal from the inquiry device 200 in a specified period S8. In the example in FIG. 15, the wireless tag device 100D is configured to transmit the report signal in the period of 3 through 4.5 seconds when the device cannot receive the inquiry signal of the inquiry device 200 in the period of 0 through 3 seconds. In this case, the report signal transmitted by the wireless tag device 100D is transmitted at the same frequency f1 as the carrier frequency used when the inquiry device 200 transmits the inquiry signal.

The wireless tag devices 100A through 100D periodically perform the reception detecting process, and detects and receives, if any, a report signal from the other wireless tag devices 100A through 100D while the inquiry signal transmitted from the inquiry device 200 enters the inactive state.

In the example in FIG. 15, the wireless tag device 100A cannot receive the inquiry signal from the inquiry device 200 and the report signal from the wireless tag device 100D in the period of 3 through 5 seconds. Therefore, the wireless tag device 100A enters the inactive state in the period of 3 through 5 seconds.

The wireless tag device 100B detects a report signal from the wireless tag device 100D, and receives the signal with the timing S10. Thus, the wireless tag device 100B receives the report signal from the wireless tag device 100D, acquires the terminal identification information about the wireless tag device 100D included in the report signal, and stores the information in the other terminal identification information 4301 of the other terminal storage unit 4300.

Like the wireless tag device 100B, the wireless tag device 100C detects the report signal from the wireless tag device 100D in the reception detecting process in the period of 4 seconds, and receives the signal with the timing S11. Thus, the wireless tag device 100C receives the report signal from the wireless tag device 100D, acquires the terminal identification information about the wireless tag device 100D included in the report signal, and stores the information in the other terminal identification information 4301 of the other terminal storage unit 4300.

The wireless tag device 100A is located outside the reach of the report signal transmitted by the wireless tag device 100D, and indicates that it could not receive the report signal from the wireless tag device 100D.

If the inquiry device 200 transmits the inquiry signal in the period of 2.5 seconds at intervals of 2.5 seconds, the next inquiry signal is transmitted in the period of 5 through 7.5 seconds as illustrated in FIG. 15.

As described above, the wireless tag devices 100A through 100C can receive the inquiry signal from the inquiry device 200, and transmit the reply signal in response to the inquiry signal.

Upon receipt of the inquiry signal from the inquiry device 200, the wireless tag devices 100A through 100C transmit the respective reply signals. The wireless tag device 100B transmits a reply signal with the timing S12, and the terminal identification information about the wireless tag device 100D is stored as the other terminal identification information 4301 in the other terminal storage unit 4300 of the wireless tag device 100B. Therefore, a reply signal is generated and transmitted based on the local terminal identification information stored in the local terminal storage unit 4200 and the other terminal identification information stored in the other terminal storage unit 4300.

Similarly, the other terminal storage unit 4300 of the wireless tag device 100C also stores the terminal identification information about the wireless tag device 100D as the other terminal identification information 4301. Therefore, the wireless tag device 100C generates and transmits a reply signal based on the local terminal identification information stored in the local terminal storage unit 4200 and the other terminal identification information stored in the other terminal storage unit 4300 with the timing S13.

Since the wireless tag device 100A is provided with only the local terminal identification information as the terminal identification information, the reply signal transmitted with the timing S14 includes the local terminal identification information only.

The inquiry device 200 receives the reply signal transmitted from the wireless tag device 100B with the timing S15, receives the reply signal transmitted from the wireless tag device 100C with the timing S16, and receives the reply signal transmitted from the wireless tag device 100A with the timing S17.

The inquiry device 200 can recognize the existence of the wireless tag devices 100A through 100D according to the terminal identification information included in the received reply signal. Especially, according to the terminal identification information about the wireless tag device 100D included in the reply signal transmitted from the wireless tag devices 100B and 100C, it is possible to recognize the existence of the wireless tag device 100D with which the inquiry device 200 cannot directly communicate.

[Reply Signal Transmission/Reception Timing]

It is preferable that the transmission timing of each signal is shifted with each other when the wireless tag devices 100A through 100D transmit reply signals so that the signals do not interfere with each other. Described below is the transmission timing for the shift of each reply signal.

Figure 16:
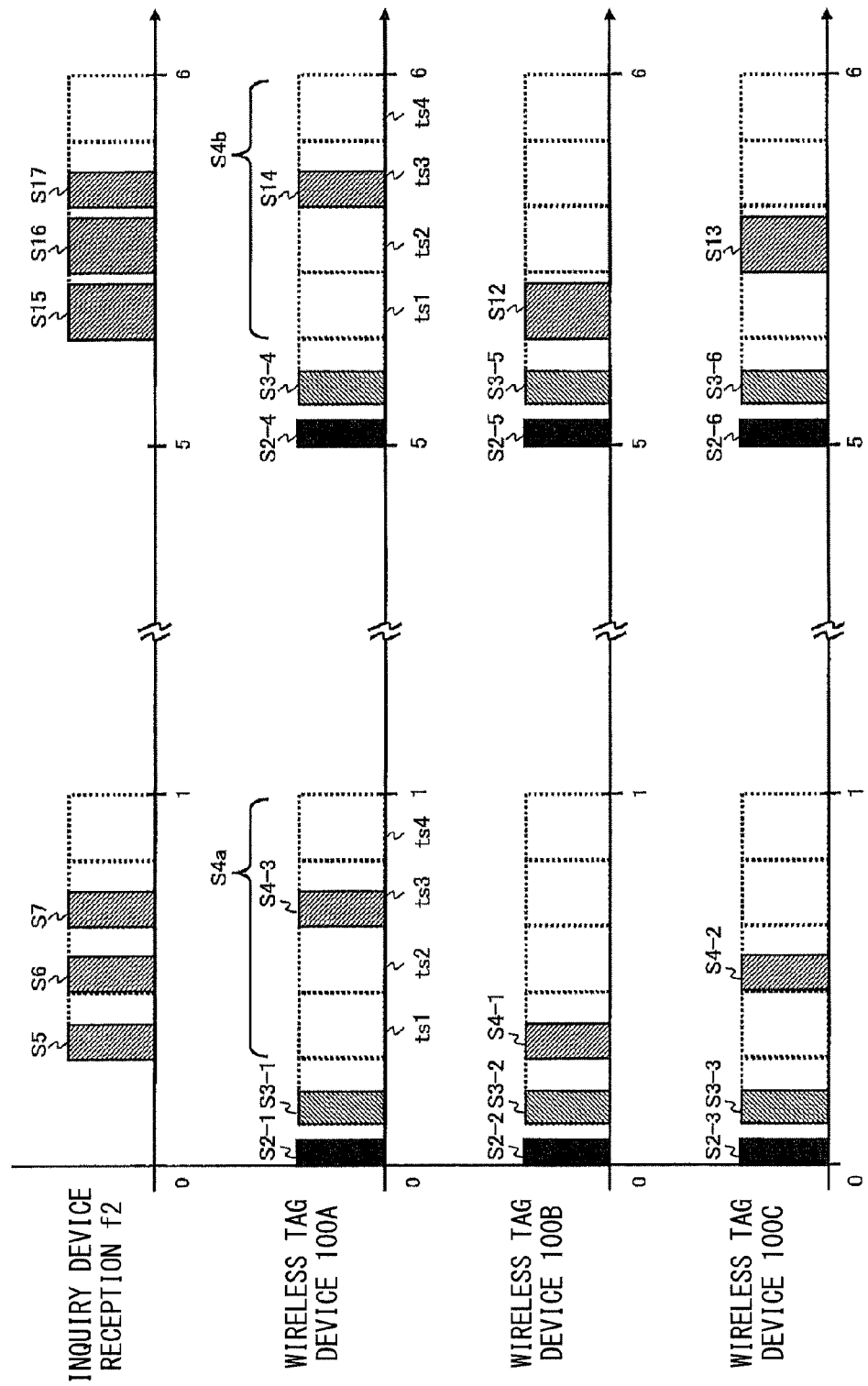
FIG. 16 is an explanatory view of the timing of transmitting and receiving a reply signal.

FIG. 16 is an explanatory view of the signal transmission/reception timing of the reply signal. In the example in FIG. 16, the period of 0 through 1 second and the period of 5 through 6 seconds are specified, and power is saved for the wireless tag device 100D which does not transmit the reply signal.

The wireless tag devices 100A through 100C perform the reception detecting process with the timing S2-1~S2-3 and S2-4~S2-6.

The wireless tag devices 100A through 100C perform the receiving process of the inquiry signal transmitted from the inquiry device 200 with the timing S3-1~S3-3 and S3-4~S3-6.

The wireless tag devices 100A through 100C transmit the reply signal in the timing period of S4a in response to the inquiry signal received with the timing S3-1~S3-3, and transmit the reply signal in the timing period of S4b in response to the inquiry signal received with the timing S3-4~S3-6.

The transmission timing period S4a of the reply signal in response to the inquiry signal received with the timing S3-1~S3-3 and the transmission timing period S4b of the reply signal in response to the inquiry signal received with the timing S3-4~S3-6 are sectioned into a plurality of time periods ts1~ts4. In this example, the transmission timing period is sectioned into four time periods ts1~ts4. However, it is to be appropriately set based on the period of the reception detecting process, the number of the wireless tag devices, the capacity of the reply information, etc., and is not limited to the case in which it is sectioned into four periods. The plural time periods obtained by sectioning a transmission timing period are hereafter referred to as time slots.

Each of the wireless tag devices 100A through 100C determines a time slot used for the timing with which the reply signal is transmitted based on a specified algorithm.

The wireless tag device 100B transmits the reply signal with the timing S4-1 using a time slot ts1 in response to the inquiry signal received with the timing S3-2.

The wireless tag device 100C transmits the reply signal with the timing S4-2 using a time slot ts2 in response to the inquiry signal received with the timing S3-3.

The wireless tag device 100A transmits the reply signal with the timing S4-3 using a time slot ts3 in response to the inquiry signal received with the timing S3-1.

The inquiry device 200 receives the reply signal transmitted from the wireless tag devices 100A through 100C with the timing S5-S7.

In the example illustrated in FIG. 16, the transmitting process of the reply signal performed by each of the wireless tag devices 100A through 100C is performed for a part of a time period without using all time assigned to each time slot.

In FIG. 16, the wireless tag device 100B transmits the reply signal transmitting process with the timing S12 using the time slot ts1 as a reply signal in response to the inquiry signal received with the timing S3-5.

The wireless tag device 100B transmits the reply signal received with the timing S12 using the time slot ts1 as a reply signal in response to the inquiry signal received with the timing S3-5.

The wireless tag device 100C transmits the reply signal with the timing S13 using the time slot ts2 as a reply signal in response to the inquiry signal received with the timing S3-6.

The wireless tag device 100A transmits the reply signal with the timing S14 using the time slot ts3 as a reply signal in response to the inquiry signal received with the timing S3-4.

The inquiry device 200 receives the reply signal transmitted from the wireless tag devices 100A through 100C with the timing S15~S17.

The reply signal transmitted by the wireless tag devices 100B and 100C includes the other terminal identification information received from the wireless tag device 100D in addition to the local terminal identification information. Therefore, the reply signal transmitted by the wireless tag device 100B with the timing S12 and the reply signal transmitted by the wireless tag device 100C with the timing S13 indicate the processing time longer than that of the reply signal transmitted by the wireless tag device 100A with the timing S14. It is assumed that the transmitting process of the reply signal in each wireless tag device 100 does not exceed the length of the time slot assigned to each wireless tag device 100.

Thus, the number of pieces of terminal identification information about another terminal which can be added to the reply signal transmitted by the wireless tag device 100 can be appropriately determined based on the time assigned to one time slot, the communication rate of the wireless communication between the wireless tag device and the inquiry device, the bit length of the entire reply signal, and the bit length of the data to be increased each time one piece of terminal identification information about another terminal.

[Embodiment 2]

Described below is an example of performing a carrier sensing process as the embodiment 2 to avoid with the inquiry signal transmitted from the inquiry device when the wireless tag device performs the transmitting process of a report signal.

The target of a carrier sensing process is not the frequency band of the carrier frequency f1 used in transmitting an inquiry signal, but the frequency band of the carrier frequency f2 used in transmitting a reply signal. Since the wireless tag device satisfying the report signal transmission condition cannot detect the inquiry signal transmitted from the inquiry device, it is configured to indirectly detect the existence of an inquiry signal by detecting the existence of a reply signal output from another wireless tag device.

Figure 17:
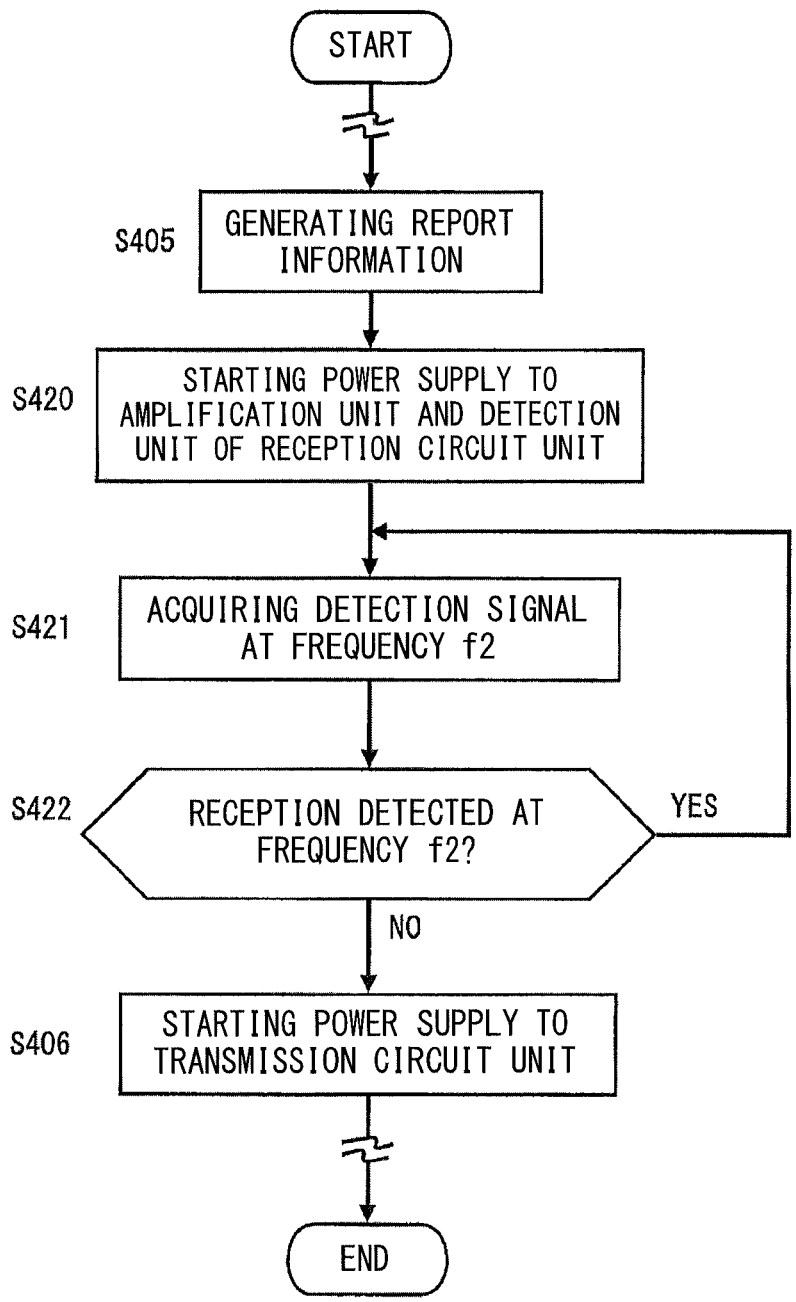
FIG. 17 is a flowchart of the process of transmitting the report signal according to the embodiment 2.

FIG. 17 is a flowchart of the process of transmitting the report signal according to the embodiment 2.

The flowchart illustrated in FIG. 17 indicates the configuration in which the processes in steps S420 through S422 are added between steps S405 and S406 in the process of transmitting the report signal illustrated in FIG. 13. Therefore, the portion described with reference to the report signal transmitting process illustrated in FIG. 13 is omitted in FIG. 17, and is not described in detail.

In addition, the wireless tag device 100 according to the embodiment 2 can be configured like the wireless tag device 100 illustrated in FIG. 1, and the detailed descriptions of the configuration are omitted here.

In the embodiment 2, the control unit 1000 performs the processes in steps S401 through S405.

In step S420, the control unit 1000 starts supplying power from the power supply unit 3000 to the amplification unit 5320 and the detection unit 5330 of the reception circuit unit 5300.

In step S421, the control unit 1000 acquires from the detection unit 5330 the detection signal indicating whether or not the modulated signal at the frequency band of the carrier frequency f2 used in transmitting the reply signal from the wireless tag device 100 has been received.

In step S422, the control unit 1000 determines whether or not the detection signal acquired from the detection unit 5330 indicates the reception of the modulated signal at the frequency band of the carrier frequency f2. In this case, if the control unit 1000 determines that the detection signal acquired from the detection unit 5330 indicates the reception of the modulated signal at the frequency band of the carrier frequency f2, then it passes control to step S421. Otherwise, it passes control to step S406.

In and after step S406, the control unit 1000 generates a report signal according to the report information generated in step S405, and transmits it to the communication unit 5000.

With the above-mentioned configuration, the existence of the inquiry signal transmitted from the inquiry device 200 can be indirectly detected by detecting in the wireless tag device 100D which cannot receive the inquiry signal from the inquiry device 200 the presence/absence of the reply signal transmitted from the other wireless tag devices 100A through 100C. Thus, it is possible to avoid the conflict between the inquiry signal transmitted from the inquiry device 200 and the report signal transmitted from the wireless tag device 100D which cannot receive the inquiry signal from the inquiry device 200.

It is also possible to have a configuration to suppress the processes in and after step S406 by performing plural times the processes in steps S421 and S422 until the detection signal indicating no reception of the modulated signal at the frequency band of the carrier frequency f2 is received continuously exceeding a specified number of times. In this case, the conflict between the inquiry signal transmitted from the inquiry device 200 and the report signal transmitted from the wireless tag device 100D can be successfully avoided.

Figure 18:
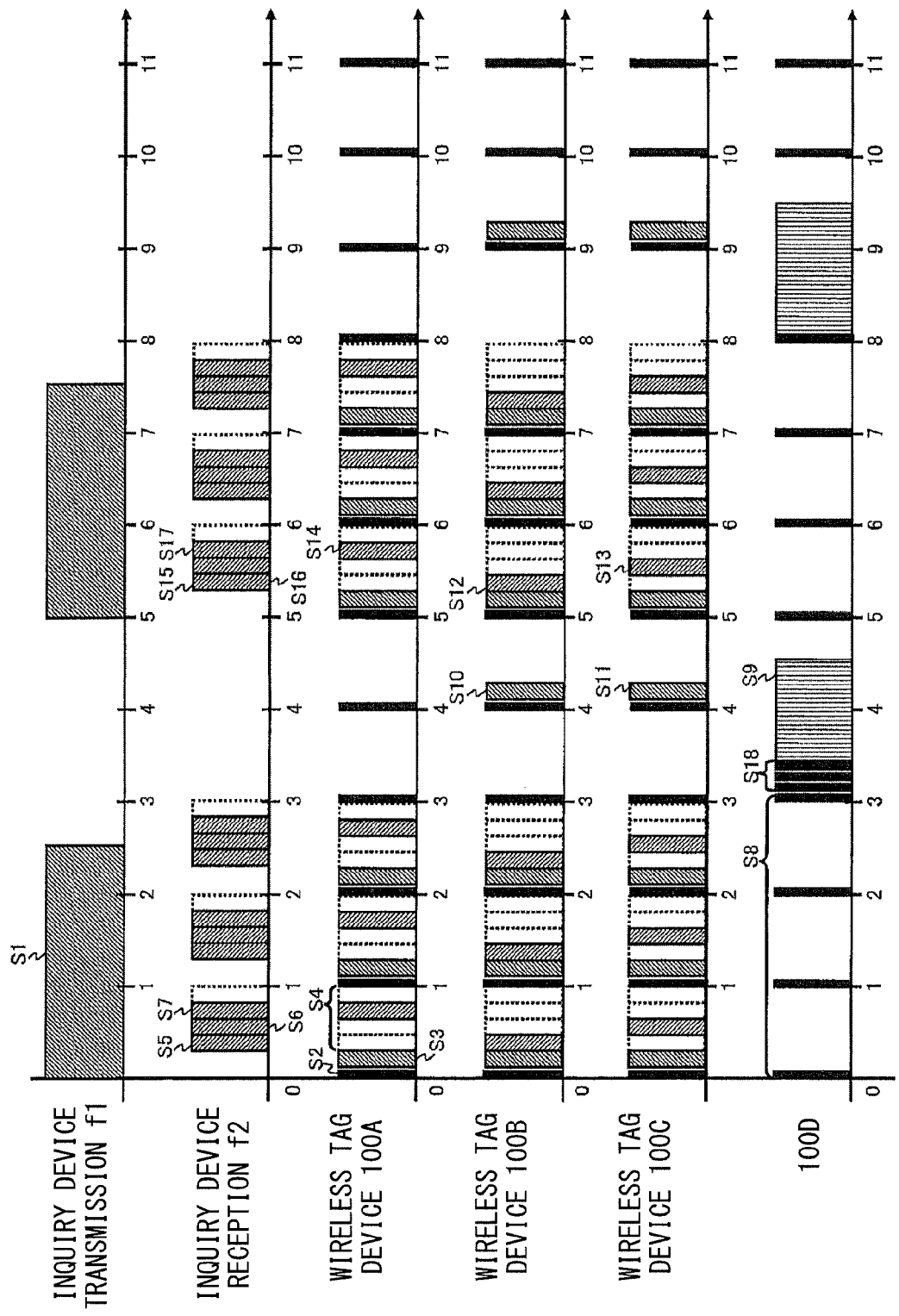
FIG. 18 is an explanatory view of the timing of transmitting and receiving a signal according to the embodiment 2.

FIG. 18 is an explanatory view of the timing of transmitting and receiving each signal according to the embodiment 2.

Relating to the transmission/reception timing as in the example according to the embodiment 1, the code similar to that in FIG. 15 is assigned.

The point different from the example illustrated in FIG. 15 is that the wireless tag device 100D performs the reception detecting process plural times with the timing S18.

Although the wireless tag device 100D performs the reception detecting process with the timing S8 in the period of 0 through 3 seconds, it cannot receive the inquiry signal of the inquiry device 200.

The wireless tag device 100D is configured so that, when it cannot receive the inquiry signal from the inquiry device 200 in the specified period S8, it can transmit the report signal including the local terminal identification information to the other wireless tag devices 100A through 100C in the specified subsequent period S9.

In the embodiment 2, the wireless tag device 100D performs the reception detecting process plural times in the period S18 before transmitting the report signal in the specified period S9.

As described above, the wireless tag device 100D detects the presence/absence of the reply signal transmitted from the other wireless tag devices 100A through 100C when the inquiry signal from the inquiry device 200 cannot be received, and indirectly detects the presence/absence of the inquiry signal from the inquiry device 200 based on the detection result of the reply signal.

In the example illustrated in FIG. 18, the wireless tag device 100D performs the reception detecting process three times in the period S18, and detects no existence of the reply signal. Therefore, it transmits a report signal in the period S9.

[Embodiment 3]

The wireless tag device 100 can be configured so that it can transmit a report signal using the frequency band of the carrier frequency f3 different from those of the inquiry signal transmitted from the inquiry device and the reply signal transmitted from the wireless tag device 100 in the report signal transmitting process.

The case above is described below as the embodiment 3.

Relating to the configuration of the wireless tag device 100 according to the embodiment 3, the configuration similar to that according to the embodiment 1 can be realized, and the block diagram of the function illustrated in FIG. 1 is to be referenced for the configuration.

[Signal Transmitting and Receiving Process]

FIG. 19 is a flowchart of the communication control according to the embodiment 3. The component also illustrated in the flowchart in FIG. 10 is assigned the same reference numeral.

In step S201, upon receipt of the activation signal from the activation unit 2000, the control unit 1000 starts supplying power from the power supply unit 3000 to the amplification unit 5320 and the detection unit 5330 of the reception circuit unit 5300.

In step S2021, the control unit 1000 acquires from the detection unit 5330 the detection signal indicating whether or not the modulated signal at the frequency band of the carrier frequency f3 has been received.

In step S2031, the control unit 1000 determines whether or not the detection signal acquired from the detection unit 5330 indicates the reception of the modulated signal at the frequency band of the carrier frequency f3. If the control unit 1000 determines that the detection signal acquired from the detection unit 5330 indicates the reception of the modulated signal at the frequency band of the carrier frequency f3, then it passes control to step S2041. Otherwise, it passes control to step S2022.

In step S2041, the control unit 1000 starts supplying power from the power supply unit 3000 to the reception circuit unit 5300.

In step S2051, the control unit 1000 reads the report information included in the report signal obtained by demodulating the modulated signal received by the reception antenna 5340 by the demodulation unit 5310.

In step S2121, the control unit 1000 reads the terminal identification information included in the acquired report information.

In step S2131, the control unit 1000 stores the acquired terminal identification information as the other terminal identification information 4301 in the other terminal storage unit 4300.

In step S2022, the control unit 1000 acquires from the detection unit 5330 the detection signal indicating whether or not the modulated signal at the frequency band of the carrier frequency f1 has been received.

In step S2032, the control unit 1000 determines whether or not the detection signal acquired from the detection unit 5330 indicates the reception of the modulated signal at the frequency band of the carrier frequency f1. If the control unit 1000 determines that the detection signal acquired from the detection unit 5330 indicates the reception of the modulated signal at the frequency band of the carrier frequency f1, it passes control to step S2042. Otherwise, it passes control to step S214.

In step S2042, the control unit 1000 starts supplying power from the power supply unit 3000 to the reception circuit unit 5300.

In step S2052, the control unit 1000 reads the inquiry information included in the inquiry signal obtained by the demodulation unit 5310 demodulating the modulated signal received by the reception antenna 5340.

In step S207, the control unit 1000 performs the reply signal transmitting process by generating a reply signal in response to the acquired inquiry information and transmitting the generated signal to the inquiry device 200. The reply signal transmitting process in step S207 is similar to the process in step S207 in FIG. 10 and in steps S301 through S311 in FIG. 12, and the detailed description is omitted here.

Then, the control unit 1000 stops supplying power from the power supply unit 3000 to the reception circuit unit 5300 in step S208, stops supplying power to the control unit 1000 in step S209, thereby placing the entire device in the inactive state.

If the control unit 1000 determines in step S2032 that the detection signal acquired from the detection unit 5330 does not indicate the reception of the modulated signal at the frequency band of the carrier frequency f1, then it adds "1" to the number of undetected times of the history information 4101 stored in the communication history unit 4100 and updates the data in step S214.

In step S215, the control unit 1000 performs the report signal transmitting process Then, the control unit 1000 stops supplying power from the power supply unit 3000 to the reception circuit unit 5300 in step S208, and stops supplying power to the control unit 1000 in step S208, thereby placing the entire device in the inactive state.

[Report signal Transmitting Process]

Figure 20:
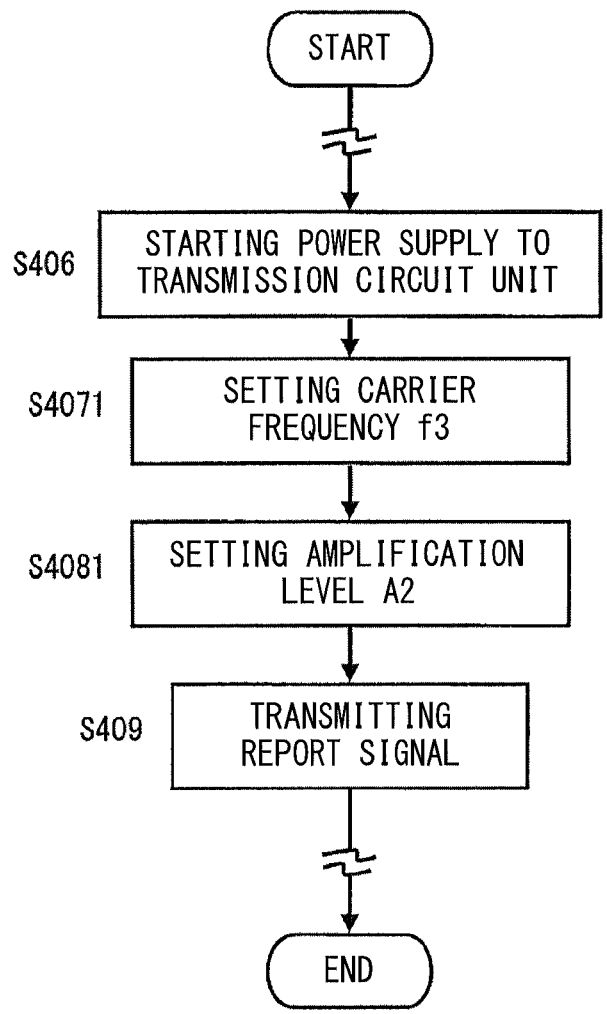
FIG. 20 is a flowchart of the report signal transmitting process according to the embodiment 3.

FIG. 20 is a flowchart of the report signal transmitting process according to the embodiment 3.

The report signal transmitting process according to the embodiment 3 is configured by replacing steps S407 and S408 of the report signal transmitting process according to the embodiment 1 illustrated in FIG. 13 with steps S4071 and S4081, and the description of the common configuration with FIG. 13 is omitted here.

The control unit 1000 performs the same processes as in steps S401 through S406 in FIG. 13, and starts supplying power from the power supply unit 3000 to the transmission circuit unit 5200.

In step S4071, the control unit 1000 sets the carrier frequency f3 in the carrier wave generation unit 5100. For the carrier frequency f3, the frequency band different from the carrier frequency f1 used for the inquiry signal transmitted by the inquiry device 200 and the carrier frequency f2 used for the reply signal transmitted by the wireless tag device 100 in response to the inquiry signal is used.

In step S4081, the control unit 1000 sets the amplification level A2 for the amplification unit 5220 of the transmission circuit unit 5200. As described above, the amplification level A2 can select the amplification level lower than the amplification level A1 used when the reply signal is output to save the power consumption in the wireless tag device 100.

[Signal Transmission/Reception Timing]

Figure 21:
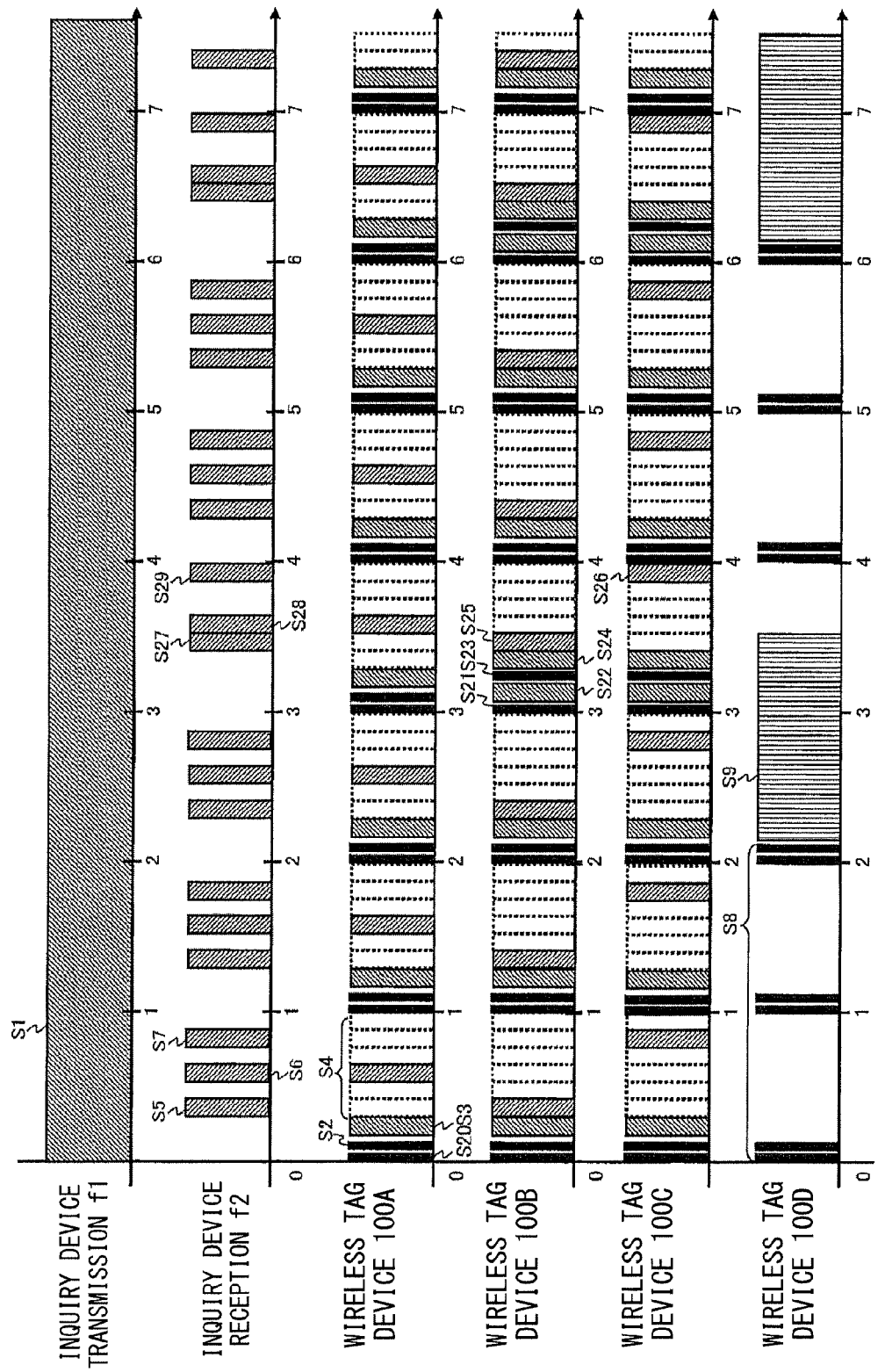
FIG. 21 is an explanatory view of the timing of transmitting and receiving a signal according to the embodiment 3.

FIG. 21 is an explanatory view of the timing of transmitting and receiving a signal according to the embodiment 3.

According to the embodiment 3, the inquiry device 200 continuously outputs an inquiry signal using the frequency band o the carrier frequency f1, and continuously transmits the inquiry signal in the period S1 of 0 through 3 seconds in the example in FIG. 21.

The wireless tag device 100A performs the reception detecting process of determining whether or not the modulated signal has been received using the frequency band of the carrier frequency f1 with the timing S2 as with the embodiment 1. Based on the reception detecting process, the inquiry signal transmitted by the inquiry device 200 is received with the timing S3, and the reply signal transmitting process is transmitted in response to the inquiry signal with the reply signal transmitting timing S4.

The wireless tag device 100A performs the reception detecting process of determining whether or not the modulated signal using the frequency band of the carrier frequency f3 has been received with the timing S20. In the example in FIG. 21, the wireless tag device 100A cannot detect the reception with the timing S20, and does not perform the subsequent receiving process.

Similarly, the wireless tag devices 100B and 100C perform the reception detecting process of determining whether or not the modulated signal using the frequency band of the carrier frequency f3 has been received with the timing S20, and perform the reception detecting process of determining whether or not the modulated signal the frequency band of the carrier frequency f1 has been received with the timing S2. In the period of 0 through 2 seconds, the wireless tag devices 100A through 100C receive the inquiry signal from the inquiry device 200 using the frequency band of the carrier frequency f1, and transmit the reply signal in response to the inquiry signal with the reply signal transmitting timing S4.

The wireless tag device 100D also performs the reception detecting process of determining whether or not the modulated signal using the frequency band of the carrier frequency f3 has been received with the timing S20, and performs the reception detecting process of determining whether or not the modulated signal using the frequency band of the carrier frequency f1 has been received with the timing S2. The wireless tag device 100D does not detect the reception of the modulated signal using any frequency band in the period of 0 through 2 seconds. In this case, the wireless tag device 100D transmits the report signal in the specified period S9 because it could not receive the inquiry signal from the inquiry device 200 for a specified period.

The wireless tag devices 100B and 100C detect the reception of the modulated signal using the frequency band of the f3 in the reception detecting process performed with the timing S21 in the period after 3 seconds, and detects the reception of the report signal transmitted by the wireless tag device 100D.

The wireless tag devices 100B and 100C receive the modulated signal using the frequency band of the carrier frequency f3 with the timing S22 based on the reception detecting process performed with the timing S21. In this case, the wireless tag devices 100B and 100C receives the report signal transmitted from the wireless tag device 100D.

Then, the wireless tag devices 100B and 100C detect the reception of the modulated signal using the frequency band of the frequency f1 in the reception detecting process performed with the timing S23, and detects the reception of the inquiry signal transmitted by the inquiry device 200.

The wireless tag devices 100B and 100C detect the reception of the modulated signal using the frequency band of the carrier frequency f1, and receives the inquiry signal from the inquiry device 200 with the timing S24.

Upon receipt of the inquiry signal from the inquiry device 200, the wireless tag device 100B transmits the reply signal with the timing S25. In this case, since the terminal identification information about the wireless tag device 100D is stored as the other terminal identification information 4301 in the other terminal storage unit 4300 of the wireless tag device 100B, a reply signal is generated and transmitted according to the local terminal identification information stored in the local terminal storage unit 4200 and the other terminal identification information stored in the other terminal storage unit 4300.

Furthermore, upon receipt of the inquiry signal from the inquiry device 200, the wireless tag device 100C similarly transmits a reply signal with the timing S26. In this case, since the terminal identification information about the wireless tag device 100D is stored as the other terminal identification information 4301 in the other terminal storage unit 4300 of the wireless tag device 100C, a reply signal is generated and transmitted according to the local terminal identification information stored in the local terminal storage unit 4200 and the other terminal identification information stored in the other terminal storage unit 4300.

The inquiry device 200 receives the reply signal transmitted from the wireless tag device 100B with the timing S27, receives the reply signal transmitted from the wireless tag device 100A with the timing S28, and receives the reply signal transmitted from the wireless tag device 100C with the timing S29.

In the example according to the embodiments 1 and 2, the inquiry signal transmitted by the inquiry device 200 and the report signal transmitted by the wireless tag device 100D use the same carrier frequency f1. Therefore, in the period in which the wireless tag device 100D which could not receive the inquiry signal from the inquiry device 200 is transmitting the report signal, the inquiry signal of the inquiry device 200 is intermittently transmitted so that there is no conflict between the inquiry signal from the inquiry device 200 and the report signal from the wireless tag device 100D.

However, according to the embodiment 3, since the carrier frequency of the inquiry signal transmitted by the inquiry device 200 is different from the carrier frequency of the report signal transmitted by the wireless tag device 100D, the inquiry device 200 can be configured to continuously transmit the inquiry signal.

[Embodiment 4]

The wireless tag device 100 can be configured to detect the ambient environmental information, the state information about the device itself, etc. and transmit the information to the inquiry device 200.

Described below as the embodiment 4 is the wireless tag device 100 provided with a sensing unit for sensing the ambient environmental information and the state information about the device itself.

The wireless tag device 100 according to the embodiment 4 is provided with a sensing unit for collecting each type of information. When the wireless tag device 100 transmits the reply signal to the inquiry device 200, it includes not only the terminal identification information in the wireless tag device 100 but also the sensing information acquired by the sensing unit in the reply signal, and transmits the signal.

Thus, there is a strong possibility that the sensing information acquired by the sensing unit has a longer data length than the terminal identification information about the wireless tag device 100. Therefore, the transmitting time required to transmit the sensing information becomes longer. Accordingly, there is the possibility that the transmission timing of the reply signal in a plurality of wireless tag devices 100 overlap. Especially, when the reply signal is transmitted by including the terminal identification information about another wireless tag device 100 together with the local terminal identification information, the data length becomes further longer, thereby causing a stronger possibility that the signal overlaps the reply signal transmitted by another wireless tag device 100, and easily generating radio interference.

With the problems taken into account, the embodiment 4 is configured by a phase in which a reply signal for notification of the existence of the wireless tag device 100 and a phase in which the wireless tag device 100 transmits the sensing information to the inquiry device 200.

Figure 22:
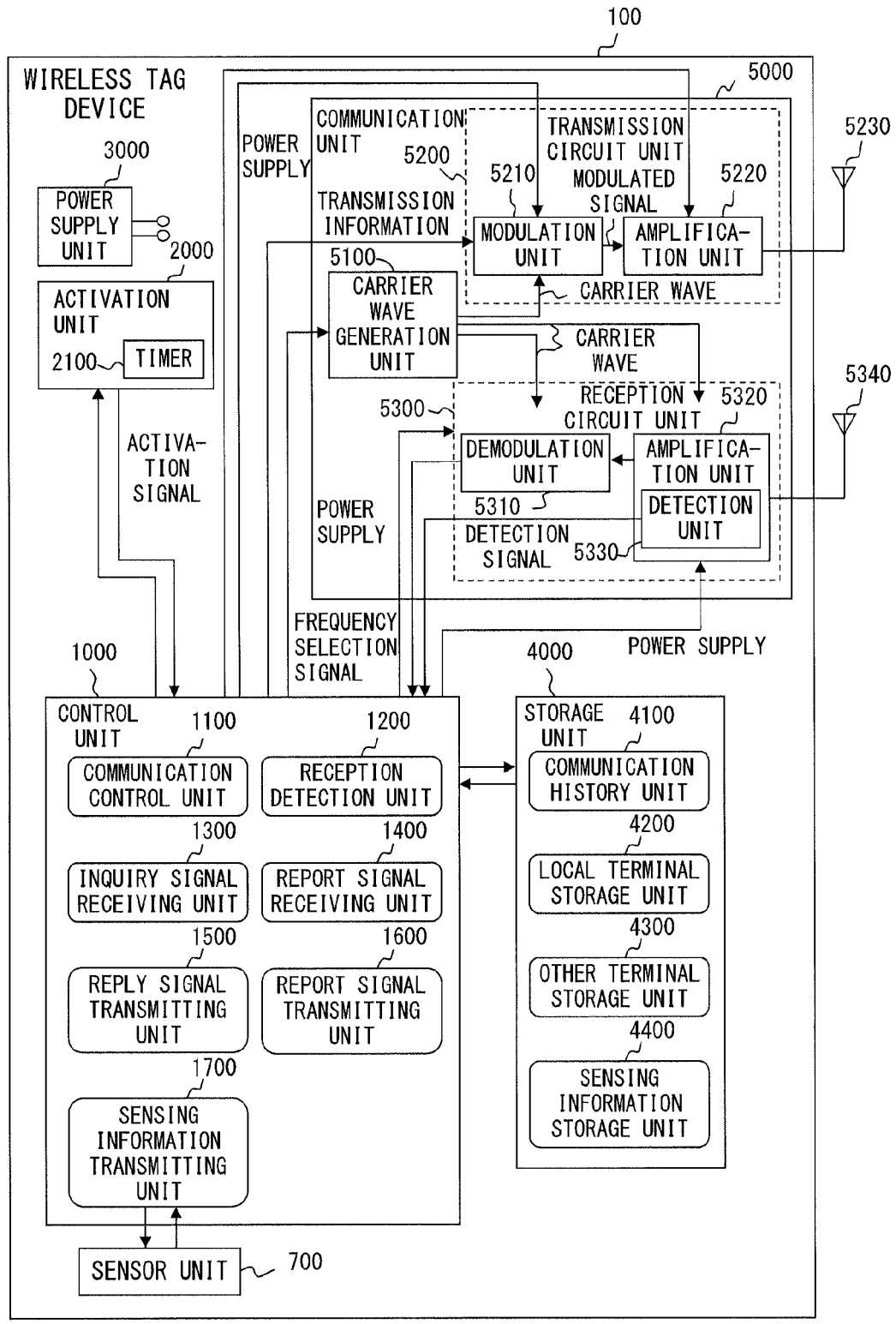
FIG. 22 is a block diagram of the function of the wireless tag device according to the embodiment 4.

FIG. 22 is a block diagram of the function of the wireless tag device according to the embodiment 4.

With the configuration according to the embodiment 4, the configuration common with the embodiment 1 is assigned the same reference numeral, and the detailed description is omitted here.

The wireless tag device 100 includes the control unit 1000, the activation unit 2000, the power supply unit 3000, the storage unit 4000, the communication unit 5000, and a sensing unit 7000.

The control unit 1000 is activated by receiving the activation signal supplied from the activation unit 2000, and sequentially reads the instruction sequence of the program stored in the wireless tag device 100 and executes the program, thereby operating as the communication control unit 1100, the transmission detection unit 1200, the inquiry signal receiving unit 1300, the report signal receiving unit 1400, the reply signal transmitting unit 1500, the report signal transmitting unit 1600, and a sensing information transmitting unit 1700.

The sensing information transmitting unit 1700 operates the control unit 1000 as a component for transmitting the sensing information acquired from the sensing unit 7000 to the communication unit 5000.

The storage unit 4000 is provided with the communication history unit 4100, the local terminal storage unit 4200, the other terminal storage unit 4300, and a sensing information storage unit 4400. The communication history unit 4100, the local terminal storage unit 4200, and the other terminal storage unit 4300 have the same configuration as the storage unit 4000 illustrated in FIG. 1. The detailed description is omitted here.

The sensing information storage unit 4400 stores the sensing information acquired by the sensor unit 7000.

FIG. 23 is an explanatory view of an example of the sensing information stored in the sensing information storage unit 4400.

The sensing information illustrated in FIG. 23 is the temperature information related to the terminal identification information. In this example, the case in which the temperature information about another terminal in addition to the temperature information about the local terminal is stored in the sensing information storage unit 4400 is exemplified.

For example, assume that the local terminal identification information about the wireless tag device 100A is "Tag 001", the sensor unit 7000 provided for the wireless tag device 100 is a temperature sensor, and the detected detection value is "10° C.". Furthermore, assume that the wireless tag device 100B provided with the "Tag 002" as the terminal identification information has the detection value "12° C." acquired by the sensor unit 7000 provided for the terminal, and that the wireless tag device 100B transmits the report signal including the sensing information together with the identification information. Upon receipt of the report signal from the wireless tag device 100B, the wireless tag device 100A stores the terminal identification information included in the report signal in the other terminal storage unit 4300, and stores the sensing information in the sensing information storage unit 4400 as associated with the terminal identification information.

The sensor unit 7000 can be configured as one or more sensors for acquiring the ambient environmental information, the state information about the local terminal, etc., and can be configured by, for example, a temperature sensor, an oscillation sensor, a magnetic sensor, a velocity sensor, an acceleration sensor, an angular velocity sensor, etc. The sensor unit 7000 can have a configuration for converting the information obtained from external units into an electric signal so that the information can be processed by the control unit 1000, and the type of sensor is not restricted.

[Outline of Process of Wireless Tag System]

The outline of the process of the wireless tag system using the wireless tag device according to the embodiment 4 is described below.

Figure 24:
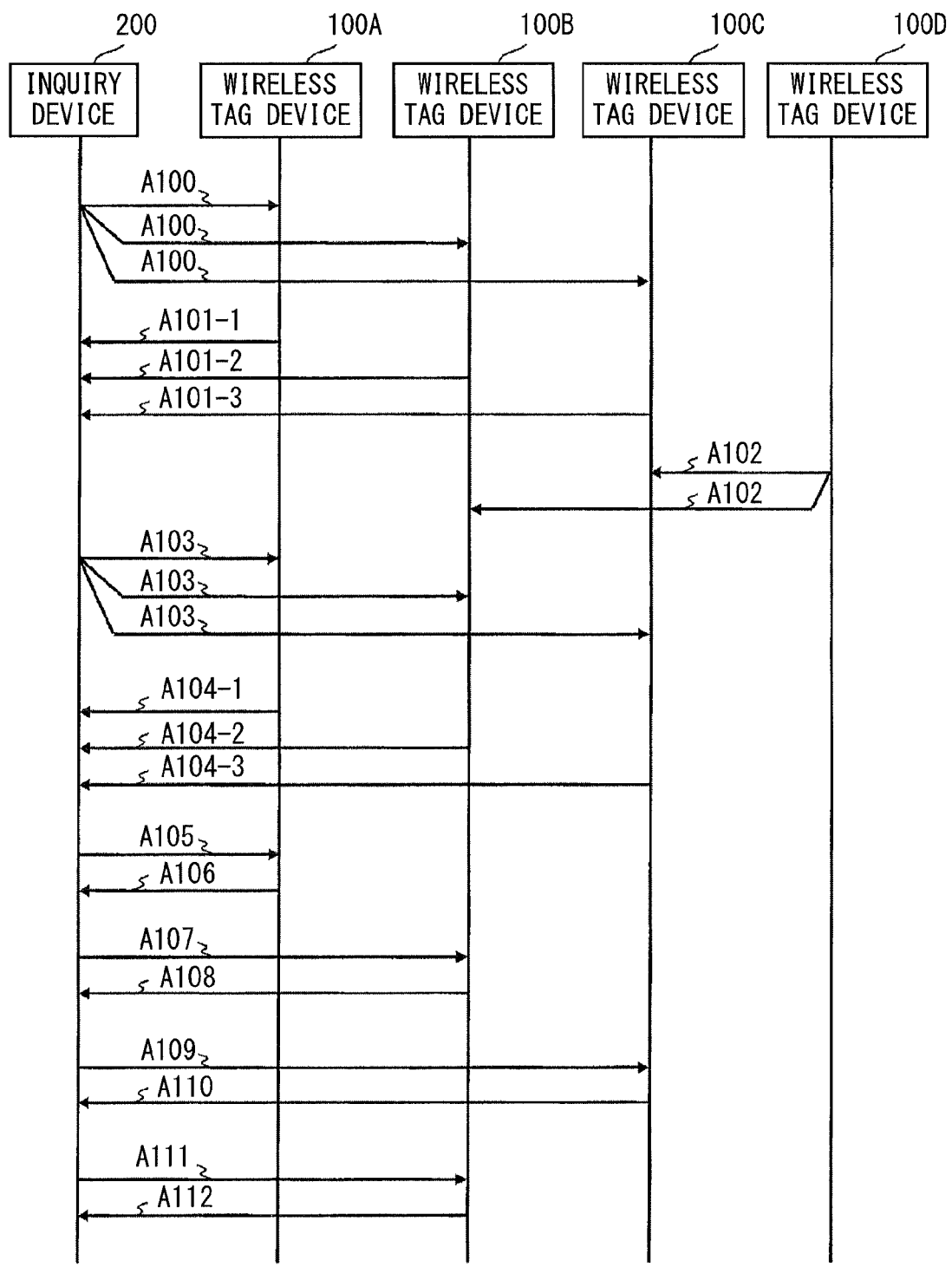
FIG. 24 is an explanatory view of the outline of the process of the wireless tag system.

FIG. 24 is an explanatory view of the outline of the process of the wireless tag system, and the component common with the component in FIG. 8 is assigned the same reference numeral.

The wireless tag system in FIG. 24 includes as with the example in FIG. 8 the inquiry device 200 and a plurality of wireless tag devices 100A through 100D.

In FIG. 24, the inquiry device 200 transmits the inquiry signal A100, and the wireless tag devices 100A through 100C receive the inquiry signal A100.

Upon receipt of the inquiry signal A100 from the inquiry device 200, the wireless tag devices 100A through 100C transmit the reply signals A101-1 through A101-3 corresponding to the inquiry signal A100. The reply signals A101-1 through A101-3 transmitted by the wireless tag devices 100A through 100C include the local terminal identification information about the wireless tag devices 100A through 100C respectively.

The wireless tag device 100D which could not receive the inquiry signal A100 from the inquiry device 200 transmits the report signal A102 through the report signal transmitting unit 1600. The report signal transmitted by the wireless tag device 100D includes the local terminal identification information about the wireless tag device 100D and the sensing information acquired by the sensor unit 7000 and stored in the sensing information storage unit 4400.

FIG. 25 is an explanatory view of an example of a frame format of a report signal transmitted by the wireless tag device 100D.

The report signal transmitted from the wireless tag device 100D has a start code, a signal type code, terminal identification information, a data length, sensing information, an error correction code, and an end code.

The start code indicates the starting point of a frame format of a report signal.

The signal type code indicates the signal type of the signal.

The terminal identification information is stored in the local terminal storage unit 4200 of the wireless tag device 100 which transmits a report signal.

The data length indicates the length of the data of the subsequent sensing information. The sensing information is acquired from the sensing information storage unit 4400 provided for the wireless tag device 100D which transmits a report signal.

The error correction code indicates the code for correction of a corresponding code error when there occurs a code error in received data. The error correction code can be replaced with an error detection code having no correcting function.

The end code indicates the end point of the frame format of a report signal.

Upon receipt of the report signal A102 transmitted from the wireless tag device 100D, the wireless tag devices 100B and 100C stores the terminal identification information included in the report signal A102 in the other terminal storage unit 4300, and stores the sensing information included in the report signal A102 in the sensing information storage unit 4400.

The inquiry device 200 transmits an inquiry signal in a specified time period, and when a specified time has passed after transmitting the inquiry signal A100, it transmits the next inquiry signal A103. Also in this case, the wireless tag devices 100A through 100C receive the inquiry signal A103 transmitted from the inquiry device 200, and transmit the reply signals A104-1~A104-3 corresponding to the inquiry signal A103.

The reply signals A104-2 and A104-3 transmitted by the wireless tag devices 100B and 100C include the terminal identification information about the wireless tag device 100D included in the report signal received from the wireless tag device 100D as other terminal identification information in addition to the local terminal identification information about the wireless tag devices 100B and 100C.

In this stage, the inquiry device 200 detects the existence of the wireless tag devices 100A through 100D.

The inquiry device 200 issues a request to transmit sensing information by specifying the wireless tag devices 100A through 100D whose existence can be confirmed, and acquires the sensing information about each of the wireless tag devices 100A through 100D.

First, the inquiry device 200 transmits a sensing information request signal A105 to the wireless tag device 100A.

FIG. 26 is an explanatory view of an example of a frame format of a sensing information request signal.

The sensing information request signal transmitted from the inquiry device 200 includes a start code, a signal type code, a terminal identification information, a first specification ID, a second specification ID an error correction code, and an end code.

The start code indicates the starting point of the frame format of the sensing information request signal.

The signal type code indicates the signal type of the signal.

In the first specification ID, the terminal identification information about the wireless tag device specified as a target of the transmission of the sensing information is set.

In the second specification ID, the terminal identification information about the wireless tag device corresponding to the sensing information as a transmission target is set.

The error correction code indicates a code for correction of a corresponding code error when a code error occurs in received data. The error correction code can be replaced with an error detection code having no correcting function.

The end code indicates the end point of the frame format of a sensing information request signal.

The sensing information request signal A105 transmitted by the inquiry device 200 to the wireless tag device 100A is configured for request of sensing information in the sensor unit 7000 of the wireless tag device 100A, and the terminal identification information about the wireless tag device 100A is stored as the terminal identification information stored in the first and second specification IDs.

Upon receipt of the sensing information request signal A105, the wireless tag device 100A transmits a sensing information reply signal A106 in response to the sensing information request signal A105. The sensing information reply signal A106 includes the sensing information stored in the sensing information storage unit 4400 of the wireless tag device 100A.

FIG. 27 is an explanatory view of an example of a frame format of a sensing information reply signal.

The sensing information reply signal transmitted from the wireless tag device 100A includes a start code, a signal type code, a data length, sensing information, an error correction code, and an end code.

The start code indicates the starting point of the frame format of the sensing information request signal.

The signal type code indicates the type of the signal.

The data length indicates the length of the data of the subsequent sensing information.

The sensing information is acquired from the sensing information storage unit 4400.

The error correction code indicates the code for correction of a corresponding code error when there occurs a code error in received data. The error correction code can be replaced with an error detection code having no correcting function.

The end code indicates the end point of the frame format of the sensing information reply signal.

In this example, upon receipt of the sensing information request signal A105, the wireless tag device 100A includes the sensing information about the sensor unit 7000 of the local terminal stored in the sensing information storage unit 4400 in the sensing information reply signal A106, and transmits the signal.

The inquiry device 200 transmits a sensing information request signal A107 to the wireless tag device 100B. The wireless tag device 100B transmits a sensing information reply signal A108 in response to the sensing information request signal A107 transmitted from the inquiry device 200.

The sensing information request signal A107 from the inquiry device 200 stores in the first specification ID and the second specification ID the terminal identification information about the wireless tag device 100B.

The sensing information reply signal A108 transmitted from the wireless tag device 100B includes the sensing information acquired from the sensor unit 7000 of the wireless tag device 100B in the sensing information stored in the sensing information storage unit 4400 of the wireless tag device 100B.

Similarly, the inquiry device 200 transmits a sensing information request signal A109 to the wireless tag device 100C. The wireless tag device 100C transmits a sensing information reply signal A110 in response to the sensing information request signal A109 transmitted from the inquiry device 200.

The sensing information request signal A109 from the inquiry device 200 stores the terminal identification information about the wireless tag device 100C in the first specification ID and the second specification ID.

The sensing information reply signal A110 transmitted from the wireless tag device 100C includes the sensing information acquired from the sensor unit 7000 of the wireless tag device 100C itself in the sensing information stored in the sensing information storage unit 4400 of the wireless tag device 100C.

The inquiry device 200 transmits a sensing information request signal A111 to the wireless tag device 100B. The wireless tag device 100B transmits a sensing information reply signal A112 in response to the sensing information request signal A111 transmitted from the inquiry device 200.

The sensing information request signal A111 from the inquiry device 200 stores the terminal identification information about the 100b in the first specification ID, and the terminal identification information about the 100d in the second specification ID.

In addition, the sensing information reply signal A112 transmitted from the wireless tag device 100B includes the sensing information acquired from the sensor unit 7000 of the wireless tag device 100D in the sensing information stored in the sensing information storage unit 4400 of the wireless tag device 100B.

Thus, the inquiry device 200 can acquire the sensing information about the wireless tag devices 100A through 100C, and also acquires the sensing information about the wireless tag device 100D indirectly.

Since the inquiry device 200 issues a request for the terminal identification information and a request for the sensing information to the wireless tag devices 100A through 100C in different stages, the data length of the reply information included in the reply signal transmitted from the wireless tag devices 100A through 100C can be reduced, thereby preventing the reply signal transmitted from each of the wireless tag devices 100A through 100C from interfering with each other.

[Communication Controlling Process]

Figure 28:
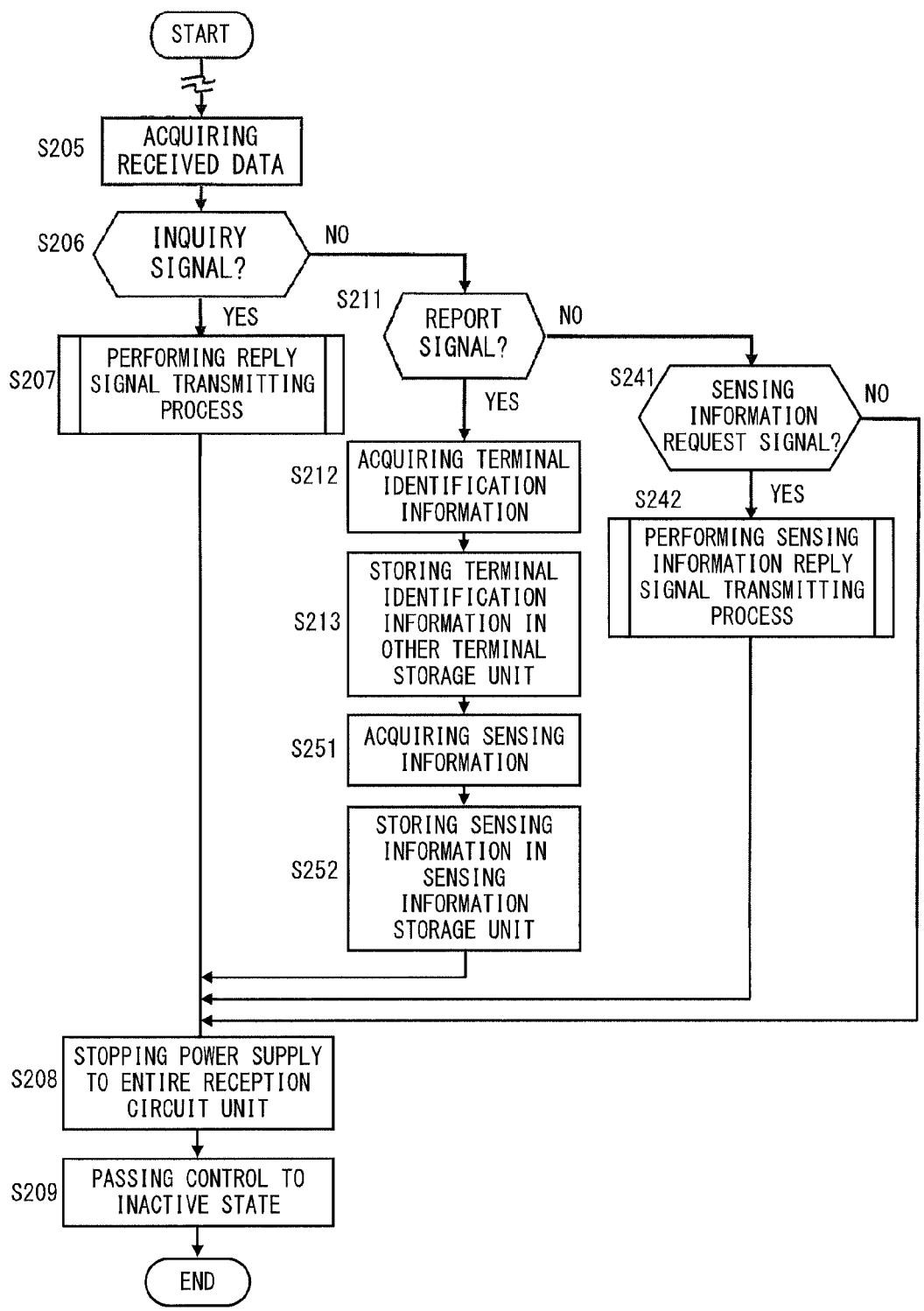
FIG. 28 is a flowchart of the operation of the communication controlling process according to the embodiment 4.

FIG. 28 is a flowchart of the operation of the communication controlling process according to the embodiment 4.

The step common with the communication controlling process according to the embodiment 1 illustrated in FIG. 10 is assigned the same reference numeral. The steps S201 through S204 and steps S214 through S215 in FIG. 10 are performed similarly in FIG. 27, but they are omitted in FIG. 27.

The control unit 1000 performs each process insteps S201 through S205 in FIG. 10, and acquires the data received by the reception circuit unit 5300.

In step S206, the control unit 1000 determines whether or not the received data obtained by the demodulation by the demodulation unit 5310 of the reception circuit unit 5300 is an inquiry signal.

The control unit 1000 refers to the signal type code of the received data, and if it determines that the signal type code refers to an inquiry signal, then it performs the reply signal transmitting process after passing control to step S207.

If the control unit 1000 determines that the signal type code of the received data is not an inquiry signal, it passes control to step S211, and determines whether or not the signal type code of the received data refers to a report signal.

If the control unit 1000 determines that the signal type code of the received data refers to a report signal, then it passes control to step S212. Otherwise, it passes control to step S241.

The report signal transmitted from the wireless tag device 100D (wireless tag device which could not receive the inquiry signal from the inquiry device 200) includes the sensing information acquired by the sensor unit 7000 in addition to the terminal identification information about the wireless tag device 100D. The frame format of the report signal has a configuration as illustrated in FIG. 25, and includes, as described above, a start code, a signal type code, a terminal identification code, a data length, sensing information, an error correction code, and an end code.

In step S212, the control unit 1000 reads the terminal identification information included in the report signal.

In step S213, the control unit 1000 stores the terminal identification information read from the report signal in the other terminal storage unit 4300.

In step S251, the control unit 1000 reads the sensing information included in the report signal.

In step S252, the control unit 1000 stores the sensing information read from the report signal in the sensing information storage unit 4400.

Afterwards, the control unit 1000 stops supplying power from the power supply unit 3000 to the reception circuit unit 5300 in step S209.

If the control unit 1000 determines in step S211 that the received data does not indicate a report signal, it passes control to step S241, and determines whether or not the received data indicates a sensing information request signal. When the control unit 1000 determines that the received data indicates a sensing information request signal, it passes control to step S242. Otherwise, it passes control to step S208.

The frame format of the sensing information request signal has a configuration as illustrated in FIG. 26, and includes, as described above, a start code, a signal type code, a first specification ID, a second specification ID, an error correction code, and an end code. The control unit 1000 refers to the signal type code of the received data, and if it determines that a sensing information request signal is indicated, it passes control to step S242.

In step S242, the control unit 1000 performs the sensing information reply signal transmitting process.

Afterwards, the control unit 1000 stops supplying power from the power supply unit 3000 to the reception circuit unit 5300 in step S209.

[Sensing Information Reply Signal Transmitting Process]

FIG. 29 is a flowchart of the operation of the sensing information reply signal transmitting process in step S242 in FIG. 28.

The control unit 1000 starts the sensing information reply signal transmitting process when it determines that the received data indicates a sensing information request signal.

In step S501, the control unit 1000 updates the history information 4101 stored in the communication history unit 4100 of the storage unit 4000. In this example, since the wireless tag device 100 has received the transmission data from the inquiry device 200, the number of undetected times of the history information 4101 is set to "0", thereby updating the data.

In step S502, the control unit 1000 reads the first specification ID included in the received sensing information request signal.

In step S503, the control unit 1000 reads the local terminal identification information stored in the local terminal storage unit 4200 of the storage unit 4000.

In step S504, the control unit 1000 determines whether or not the first specification ID included in the sensing information request signal matches the local terminal identification information stored in the local terminal storage unit 4200. If the control unit 1000 determines that the first specification ID included in the sensing information request signal matches the local terminal identification information stored in the local terminal storage unit 4200, then it passes control to step S505. Otherwise, the unit terminates the process.

In step S505, the control unit 1000 reads the second specification ID included in the sensing information request signal.

In step S506, the control unit 1000 reads from the sensing information storage unit 4400 of the storage unit 4000 the sensing information about the wireless tag device corresponding to the read second specification ID.

In step S507, the control unit 1000 generates sensing information reply information configuring a sensing information request signal according to the sensing information read from the sensing information storage unit 4400 of the storage unit 4000.

The sensing information reply signal including the sensing information reply information is configured by the frame format as illustrated in FIG. 27 as described above.

The sensing information reply information includes a start code, a signal type code, a data length, sensing information, an error correction code, an end code.

The control unit 1000 stores a code indicating a sensing information request signal as a signal type code, stores the sensing information read from the sensing information storage unit 4400, and generates sensing information reply information.

If the first specification ID does not match the second specification ID in the sensing information request signal, the wireless tag device specified by the first specification ID reads the sensing information (about the wireless tag device specified by the second specification ID) about another terminal stored in the sensing information storage unit 4400, stores the information in the sensing information, and generates the information as a sensing information request signal.

In step S508, the control unit 1000 starts supplying power from the power supply unit 3000 to the transmission circuit unit 5200.

In step 509, the control unit 1000 transmits to the carrier wave generation unit 5100 an instruction signal for setting in the carrier frequency f2 the frequency of a carrier wave to be generated.

In step S510, the control unit 1000 transmits to the amplification unit 5220 of the transmission circuit unit 5200 an instruction signal for setting the amplification level of the transmission signal in the A1.

In step S511, the control unit 1000 transmits the sensing information reply signal to the transmission circuit unit 5200.

In step S512, the control unit 1000 stops supplying power from the power supply unit 3000 to the transmission circuit unit 5200 after completing the transmission of the sensing information reply signal from the transmission circuit unit 5200.

[Report Signal Transmitting Process]

As described in FIG. 24, the wireless tag device 100D which has not received the inquiry signal from the inquiry device 200 generates the report signal A102 including the local terminal identification information and the sensing information as a detection value of the sensor unit 7000, and transmits the signal to other wireless tag devices 100B and 100C.

FIG. 30 is a flowchart of the operation of the report signal transmitting process.

The report signal transmitting process according to the embodiment 4 has the same step as the report signal transmitting process according to the embodiment 1 illustrated in FIG. 13, and is different in that step S4041 is inserted between steps S404 and S405 in FIG. 13.

The control unit 1000 performs the processes in steps S401 through S404 in FIG. 13, thereby reading the local terminal identification information 4201 stored in the inquiry device 200.

In step S4041, the control unit 1000 refers to the sensing information storage unit 4400, and reads the sensing information corresponding to the local terminal identification information.

In a control unit 405, the control unit 1000 generates report information according to the read local terminal identification information and the sensing information.

Afterwards, the control unit 1000 performs the processes in and after step S406, generates a report signal, and transmits the signal to the wireless tag devices 100B and 100C.

[Signal Transmission/Reception Timing]

Figure 31:
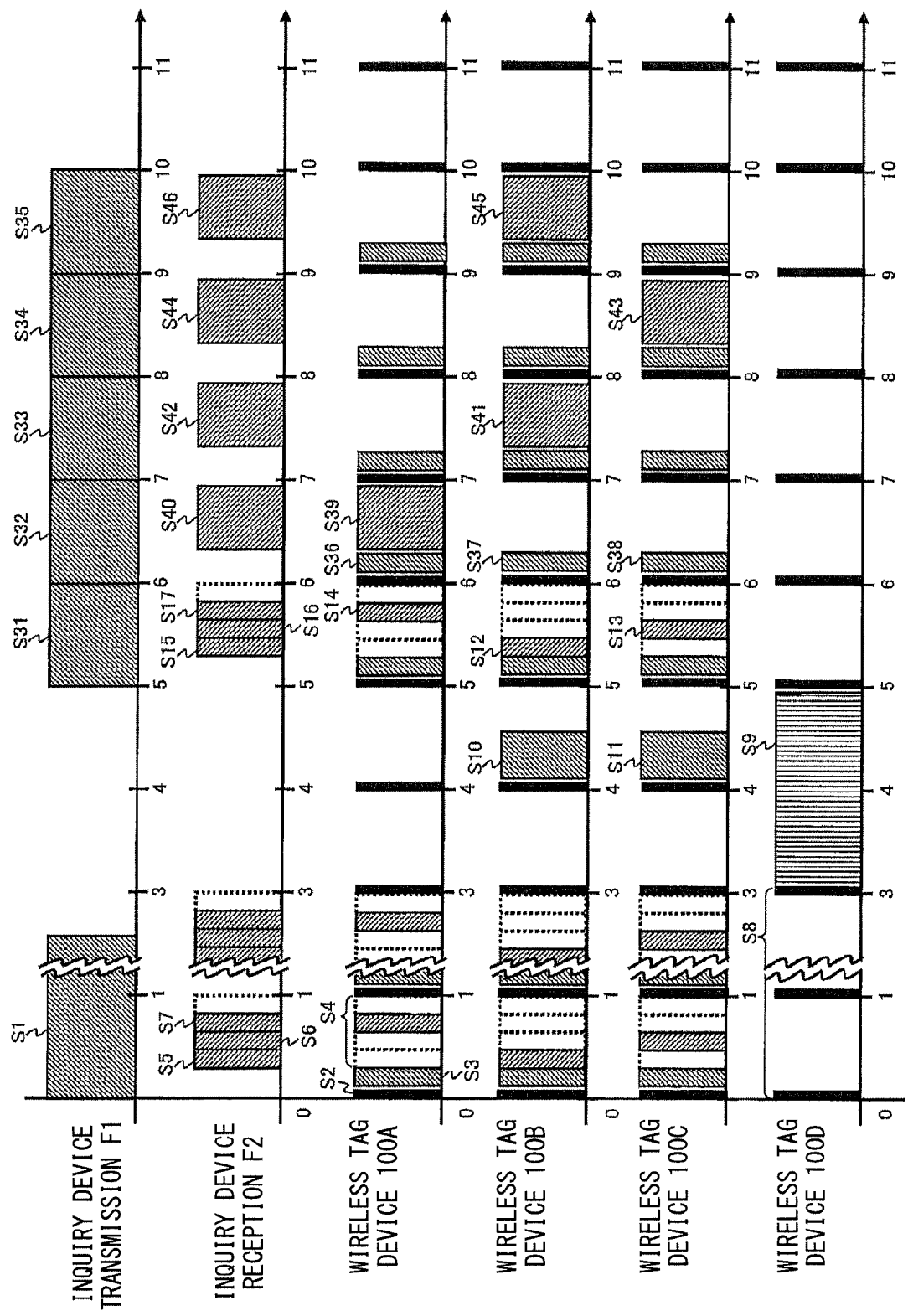
FIG. 31 is an explanatory view of the timing of transmitting and receiving a signal according to the embodiment 4.

FIG. 31 is an explanatory view of the timing of transmitting and receiving a signal according to the embodiment 4.

In the embodiment 4, the inquiry device 200 transmits an inquiry signal in the period 0 through 3 seconds in S1 as in the embodiment 1.

Since the operation of the wireless tag devices 100A through 100D which receive the inquiry signal from the inquiry device 200 is similar to that according to the embodiment 1 in the period of 0 through 3 seconds, the description is omitted here.

The wireless tag device 100D which could not receive the inquiry signal from the inquiry device 200 transmits a report signal at in the period of 3 through 5 seconds in the specified period S9. The report signal includes the terminal identification information about the wireless tag device 100D and the sensing information as a detection value detected by the sensor unit 7000 of the wireless tag device 100D. The report signal transmitted from the wireless tag device 100D is a modulated signal at the frequency band of the carrier frequency f1. Thus, the inquiry device 200 is configured not to transmit an inquiry signal in the period in which it is assumed that wireless tag device 100D which could not receive the inquiry signal from the inquiry device 200 transmits a report signal.

The wireless tag devices 100B and 100C detect the report signal from the wireless tag device 100D in the reception detecting process immediately after the period of 4 seconds, and receive the signal with the timing of S10 and S11 respectively. The report signal which is received by the wireless tag devices 100D and 100C includes the terminal identification information about the wireless tag device 100D and the sensing information in the wireless tag device 100D, and the information is stored in the local terminal storage unit 4200 and the sensing information storage unit 4400 of the storage unit 4000 respectively.

The inquiry device 200 transmits an inquiry signal using the frequency band of the carrier frequency f1 in the time period of S31 at 5 through 6 seconds.

The wireless tag device 100A transmits a reply signal with the timing S14 in response to the inquiry signal from the inquiry device 200.

The wireless tag device 100B transmits a reply signal with the timing S12 in response to the inquiry signal from the inquiry device 200.

The wireless tag device 100C transmits a reply signal with the timing S13 in response to the inquiry signal from the inquiry device 200.

Since the terminal identification information about another terminal is not stored in the other terminal storage unit 4300 of the wireless tag device 100A, only the local terminal identification information is transmitted as a reply signal.

On the other hand, since the wireless tag devices 100B and 100C store the terminal identification information about the wireless tag device 100D in the other terminal storage unit 4300, the reply signal including the terminal identification information about the wireless tag device 100D is generated and transmitted in addition to the local terminal identification information. Thus, the inquiry device 200 indirectly acquires the terminal identification information about the wireless tag device 100D in addition to the terminal identification information about the wireless tag devices 100A through 100C.

The inquiry device 200 transmits a sensing information request signal using the frequency band of the carrier frequency f1 in the in the time period of S32 at 6 through 7 seconds. As described above, the sensing information request signal stores the terminal identification information about the wireless tag device as a reception request target in the first specification ID, and stores the terminal identification information about the wireless tag device corresponding to the sensing information as a transmission target in the second specification ID.

In this example, the sensing information request signal transmitted in the time period S32 stores the terminal identification information about the wireless tag device 100A in the first specification ID and the second specification ID.

By the wireless tag devices 100A through 100C performing the reception detecting process, the reception of the sensing information request signal from the inquiry device 200 is detected, and received with the timing of S36, S37, and S38 respectively.

Since the sensing information request signal transmitted by the inquiry device 200 in the time period S32 stores the terminal identification information about the wireless tag device 100A as the first specification ID, only the wireless tag device 100A transmits the reply signal in response to the sensing information request signal. In the example in FIG. 31, the wireless tag device 100A generates and transmits the sensing information reply signal including the sensing information about the local terminal stored in the sensing information storage unit 4400 with the timing S39.

The inquiry device 200 receives the sensing information reply signal transmitted from the wireless tag device 100A with the timing S40.

The inquiry device 200 transmits the sensing information request signal using the frequency band of the carrier frequency f1 in the time period S33 at 7 through 8 seconds. The transmitted sensing information request signal stores the terminal identification information about the wireless tag device 100B in both first specification ID and second specification ID.

Also in this case, by each of the wireless tag devices 100A through 100C performing the reception detecting process, the reception of the sensing information request signal from the inquiry device 200 is detected, and each of them receives the sensing information request signal.

Since the sensing information request signal transmitted by the inquiry device 200 in the time period S33 stores the terminal identification information about the wireless tag device 100B as the first specification ID, only the wireless tag device 100B transmits the reply signal in response to the sensing information request signal. In the example in FIG. 31, the wireless tag device 100B generates and transmits the sensing information reply signal including the sensing information about the local technique stored in the sensing information storage unit 4400 with the timing S41.

The inquiry device 200 receives the sensing information reply signal transmitted from the wireless tag device 100B with the timing S42.

The inquiry device 200 transmits a sensing information request signal using the frequency band of the carrier frequency f1 in the time period S34 at 8 through 9 seconds. The transmitted sensing information request signal stores the terminal identification information about the wireless tag device 100C in the first specification ID and the second specification ID.

In this case, by the wireless tag devices 100A through 100C performing the reception detecting process, the reception of the sensing information request signal from the inquiry device 200 is detected, and each of the devices receives the sensing information request signal.

Since the sensing information request signal transmitted by the inquiry device 200 in the time period S34 stores the terminal identification information about the wireless tag device 100C as the first specification ID, only the wireless tag device 100C transmits the reply signal in response to the sensing information request signal. In the example in FIG. 31, the wireless tag device 100C generates and transmits a sensing information reply signal including the sensing information about the local terminal stored in the sensing information storage unit 4400 with the timing S43.

The inquiry device 200 receives the sensing information reply signal transmitted from the wireless tag device 100C with the timing S44.

The inquiry device 200 transmits the sensing information request signal using the frequency band of the carrier frequency f1 in the time period S35 at 9 through 10 seconds. The transmitted sensing information request signal stores the terminal identification information about the wireless tag device 100B in the first specification ID, and the terminal identification information about the wireless tag device 100D in the second specification ID.

Also in this case, by the wireless tag devices 100A through 100C performing the reception detecting process, the reception of the sensing information request signal from the inquiry device 200 is detected, and each of the devices receives the sensing information request signal.

Since the sensing information request signal transmitted by the inquiry device 200 in the time period S35 stores the terminal identification information about the wireless tag device 100B as the first specification ID, only the wireless tag device 100B transmits the reply signal in response to the sensing information request signal.

In this case, the wireless tag device 100B refers to the second specification ID of the sensing information request signal, and reads the sensing information about the corresponding terminal from the sensing information storage unit 4400 of the storage unit 4000. Therefore, in the example in FIG. 31, the wireless tag device 100B generates and transmits the sensing information reply signal including the sensing information about the wireless tag device 100D stored in the sensing information storage unit 4400 with the timing S43.

The inquiry device 200 receives the sensing information reply signal transmitted from the wireless tag device 100B with the timing S46.

As described above, the wireless tag system according to the embodiment 4 can acquire the sensing information about the wireless tag device 100D which could not receive the inquiry signal of the inquiry device 200 through another wireless tag device 100B.

By configuring the sensing information having a large amount of information so that it can be transmitted and received separate from the terminal identification information, reply signals of a plurality of wireless tag devices can be prevented from overlap one another, thereby suppressing the interference of radio waves.

The present invention can be applied to a wireless tag system for realizing a plurality of wireless tag devices, and can be available in an installation environment in which a null point can arise where an inquiry signal from an inquiry device does not reach. Practically, it can be used in managing the use state of clothing in a clothing warehouse.

When a wireless tag device receives an inquiry signal from an inquiry device, it receives a reflected wave reflected by, for example, a wall, a floor, a column, etc., etc. in addition to the direct wave directly reaching from the inquiry device. When the direct wave and the reflected wave have opposing phases, there is the possibility that it is hard to perform the wireless communication although the inquiry device and the wireless tag device are located in positions where communications can be performed. The above-mentioned null point (unsensitive point) is the installation position of a wireless tag device where there arises such an occasion.

According to some of the embodiments above, although a wireless tag device is located in a position where it is difficult to perform a wireless communication with an inquiry device, it enables a communication with the inquiry device to be performed through another wireless tag device, thereby recognizing the existence of the wireless tag device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:
1. A wireless tag device capable of communicating with an inquiry device, comprising:
   a local terminal storage unit storing local terminal identification information which can be discriminated from another wireless tag device;
   a reception detection unit detecting a signal transmitted from the inquiry device or another wireless tag device;

an inquiry signal receiving unit receiving the inquiry signal detected by the reception detection unit if the inquiry signal is transmitted using a first frequency from the inquiry device;

a reply signal transmitting unit transmitting a reply signal in response to the inquiry signal using a second frequency different from the first frequency; and a report signal transmitting unit transmitting a report signal including the local terminal identification information stored in the local terminal storage unit using a third frequency different from the second frequency if the inquiry signal transmitted from the inquiry device cannot be detected continuously in a specified time period in the reception detection unit;

a report signal receiving unit receiving the report signal when a signal detected by the reception detection unit is transmitted using the second frequency from the other wireless tag device; and another terminal storage unit storing terminal identification information included in the report signal received by the report signal receiving unit as other terminal identification information, wherein the reply signal transmitting unit generates the reply signal according to local terminal identification information stored in the local terminal storage unit and other terminal identification information stored in the other terminal storage unit in response to the inquiry signal from the inquiry device, and transmits the generated signal to the inquiry device.

2. The device according to claim 1, wherein
the report signal transmitting unit transmits the report signal when the reception detection unit does not continuously detect an inquiry signal from the inquiry device for a specified time period, and detects that there is no reply signal transmitted by another wireless tag device.

3. The device according to claim 1, wherein
the first and third frequencies have a same frequency band.

4. The device according to claim 1, wherein
the report signal transmitting unit sets lower transmission power of the report signal than transmission power of the reply signal transmitted in the reply signal transmitting process.

5. A storage unit storing a control program used in a wireless tag device which is provided with a local terminal storage unit storing local terminal identification information which can be identified from another wireless tag device and can communicate with an inquiry device, the control program operates a wireless tag device as:

a reception detection unit detecting a signal transmitted from the inquiry device or another wireless tag device;

an inquiry signal receiving unit receiving an inquiry signal detected by the reception detection unit if the inquiry signal is transmitted using a first frequency from the inquiry device;

a reply signal transmitting unit transmitting a reply signal in response to the inquiry signal using a second frequency different from the first frequency; and a report signal transmitting unit transmitting a report signal including the local terminal identification information stored in the local terminal storage unit using a third frequency different from the second frequency if the inquiry signal transmitted from the inquiry device cannot be detected continuously in a specified time period in the reception detection unit;

a report signal receiving unit receiving the report signal when a signal detected by the reception detection unit is transmitted using the second frequency from the other wireless tag device; and another terminal storage unit storing terminal identification information included in the report signal received by the report signal receiving unit as other terminal identification information, wherein the reply signal transmitting unit generates the reply signal according to local terminal identification information stored in the local terminal storage unit and other terminal identification information stored in the other terminal storage unit in response to the inquiry signal from the inquiry device, and transmits the generated signal to the inquiry device.

6. A control method for a wireless tag device which is provided with a local terminal storage unit storing local terminal identification information which can be identified from another wireless tag device and can communicate with an inquiry device, comprising:

detecting a signal transmitted from the inquiry device or another wireless tag device;

receiving an inquiry signal detected by the reception detection unit if the detected signal is the inquiry signal which is transmitted using a first frequency from the inquiry device;

transmitting a reply signal in response to the inquiry signal using a second frequency different from the first frequency; and transmitting a report signal including the local terminal identification information stored in the local terminal storage unit using a third frequency different from the second frequency if the inquiry signal transmitted from the inquiry device cannot be detected continuously in a specified time period;

a report signal receiving unit receiving the report signal when a signal detected by the reception detection unit is transmitted using the second frequency from the other wireless tag device; and another terminal storage unit storing terminal identification information included in the report signal received by the report signal receiving unit as other terminal identification information, wherein the reply signal transmitting unit generates the reply signal according to local terminal identification information stored in the local terminal storage unit and other terminal identification information stored in the other terminal storage unit in response to the inquiry signal from the inquiry device, and transmits the generated signal to the inquiry device.

* * * * *